US009520017B2

(12) United States Patent
Aida

(10) Patent No.: US 9,520,017 B2
(45) Date of Patent: *Dec. 13, 2016

(54) GAMING DEVICE FOR DETERMINING A RE-DRAWING GROUP FOR FOLLOWING GAMES

(71) Applicant: Konami Gaming, Inc., Las Vegas, NV (US)

(72) Inventor: Eiji Aida, Chiyoda-ku (JP)

(73) Assignee: KONAMI GAMING, INC., Las Vegas, NV (US)

( * ) Notice: Subject to any disclaimer, the term of this patent is extended or adjusted under 35 U.S.C. 154(b) by 59 days.

This patent is subject to a terminal disclaimer.

(21) Appl. No.: 14/596,077

(22) Filed: Jan. 13, 2015

(65) Prior Publication Data

US 2015/0126266 A1 May 7, 2015

Related U.S. Application Data

(63) Continuation of application No. 13/891,059, filed on May 9, 2013, which is a continuation of application No. 13/169,639, filed on Jun. 27, 2011, now Pat. No. 8,465,359, which is a continuation of application No. 12/890,385, filed on Sep. 24, 2010, now Pat. No. 8,449,376, which is a continuation of application No.
(Continued)

(30) Foreign Application Priority Data

Apr. 30, 2003 (JP) ................................ 2003-125600

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |
| ***G07F 17/34*** | (2006.01) |

(52) U.S. Cl.
CPC .......... *G07F 17/3213* (2013.01); *G07F 17/32* (2013.01); *G07F 17/3267* (2013.01); *G07F 17/34* (2013.01)

(58) Field of Classification Search
None
See application file for complete search history.

(56) References Cited

U.S. PATENT DOCUMENTS

| | | | |
|---|---|---|---|
| 4,037,845 | A | 7/1977 | Hooker |
| 5,722,891 | A | 3/1998 | Inoue |
| 5,976,016 | A | 11/1999 | Moody et al. |

(Continued)

FOREIGN PATENT DOCUMENTS

| | | |
|---|---|---|
| JP | 10-328351 | 12/1998 |
| JP | 3330338 | 8/1999 |
| JP | 2002-191782 | 7/2002 |

*Primary Examiner* — Kevin Y Kim
(74) *Attorney, Agent, or Firm* — Howard & Howard Attorneys PLLC

(57) ABSTRACT

To display a plurality of symbols in a plurality of display regions, upon starting a game, and in a case where trigger symbols are stop displayed in any of the plurality of display regions, to draw for specific display regions where trigger symbols are displayed, from a plurality of types of symbols so that the symbols are displayed having a predetermined relationship among the symbols in at least game units, and at the same time, to draw for general display regions that have symbols other than the trigger symbol displayed, from a plurality of types of symbols so that arbitrary symbols are independently displayed.

19 Claims, 40 Drawing Sheets

Related U.S. Application Data

10/835,887, filed on Apr. 29, 2004, now Pat. No. 7,824,260.

(56) References Cited

U.S. PATENT DOCUMENTS

| | | | |
|---|---|---|---|
| 5,997,401 | A | 12/1999 | Crawford |
| 6,186,894 | B1 | 2/2001 | Mayeroff |
| 6,220,959 | B1 | 4/2001 | Holmes, Jr. et al. |
| 6,241,607 | B1 | 6/2001 | Payne et al. |
| 6,270,412 | B1 | 8/2001 | Crawford et al. |
| 6,394,902 | B1 | 5/2002 | Glavich et al. |
| 6,413,162 | B1 | 7/2002 | Baerlocher et al. |
| 6,471,208 | B2 | 10/2002 | Yoseloff et al. |
| 7,824,260 | B2 | 11/2010 | Aida |
| 2004/0026854 | A1 | 2/2004 | Inoue |

FIG. 54

| | |
|---|---|
| ONE PAIR | THERE ARE TWO CARDS (ONE PAIR) OF SAME NUMBER IN FIVE CARDS |
| TWO PAIR | THERE ARE TWO KINDS OF PAIRS IN FIVE CARDS |
| THREE CARD | THERE ARE THREE CARDS OF SAME NUMBER IN FIVE CARDS |
| STRAIGHT | NUMBERS ARE SEQUENTIAL IN ALL FIVE CARDS |
| FLUSH | ALL FIVE CARDS ARE OF SAME SUIT (SPADES, DIAMONDS, ETC.) |
| FULL HOUSE | THERE IS ONE PAIR AND THREE CARD IN FIVE CARDS |
| FOUR OF A KIND | THERE ARE FOUR SAME NUMBERS IN FIVE CARDS |
| STRAIGHT FLUSH | BOTH FLUSH AND STRAIGHT ARE IN FIVE CARDS |

GAMING DEVICE FOR DETERMINING A RE-DRAWING GROUP FOR FOLLOWING GAMES

CROSS-REFERENCES TO RELATED APPLICATIONS

This application is a continuation of U.S. patent application Ser. No. 13/891,059, filed May 9, 2013, which is a continuation of U.S. patent application Ser. No. 13/169,639, filed Jun. 27, 2011(now U.S. Pat. No. 8,465,359, Issued on Jun. 18, 2013), which is a continuation of U.S. patent application Ser. No. 12/890,385, filed Sept. 24, 2010(now U.S. Pat. No. 8,449,376, Issued on May 28, 2013), which is a continuation of U.S. patent application Ser. No. 10/835,887, filed Apr. 29, 2004(now U.S. Pat. No. 7,824,260, Issued on Nov. 2, 2010), which claims priority to Japanese Application No. JP-2003-125600, filed on Apr. 30, 2003, all of which are incorporated herein by reference in their entirety for all purposes.

FIELD OF THE INVENTION

The present invention relates to a gaming machine having a re-drawing function.

DESCRIPTION OF THE RELATED ART

Conventionally, there are known pachinko-type gaming machines comprising slot machine and reel units that carry out re-drawing. For example, in the pachinko gaming machine disclosed in Publication of Japanese Patent No. 3330338, when a player operates a hitting handle, pachinko balls are hit into a game region formed in a front surface of a game board one by one. A reel unit that can change display or stop display of a plurality of symbols, and a plurality of starting winning holes are provided on the play surface. In a case where a pachinko ball goes into any of the starting winning holes, the pachinko ball is detected by a starting winning ball detector, and each reel in the reel unit rotates based on a detection signal of the starting winning ball detector, so as to change display the plurality of symbols. After a predetermined time has passed, a second reel (center reel) stops, and in a case where the second reel that stops is a symbol other than a specific symbol, a first reel (left reel) stops thereafter, and finally, a third reel (right reel) stops. When every reel stops, in a case where a combination of pre-set specific symbols are displayed, a situation favorable for the player occurs by for example, opening an opening/closing plate of a variable prize winning ball device in a tulip-shape, and creating a situation where a predetermined game value can be provided to the player.

Each reel can display three symbols in the longitudinal direction. Therefore, symbols displayed by the three reels are in a 3×3 matrix alignment. In this matrix, a total of five lines are formed: three horizontal lines and two diagonal lines.

On the other hand, in a case where a symbol stop displayed is a specified symbol (for example "7") at the time the second reel stops, the change display discussed below is carried out. The first and third reels continue change display of the symbols, but the first and third reels are stopped at the same time, or are stopped in an order of first reel, then the third reel, after slowly rotating the "7" symbol horizontally, downwards, or upwards, in a state where the symbols are matched. By this, a situation where a matching is possible in a win line of a center horizontal direction, a win line of a downward direction, or win line of an upwards direction is possible, while the rotation of the first and third reels.

However, in the conventional re-drawing method, it is difficult to correspond to a slot machine with many reels, or a slot machine that validates a plurality of symbols on one reel. In the conventional method, when a predetermined condition is met, re-drawing is carried out by the entire reels, so as to standardize variation of re-drawing. Because this kind of method is well known, it is becoming insufficient to arouse player interest. Accordingly, there is a need for a new method that increases variation, and the possibility of finding new game functions in order to increase player interest towards the game.

BRIEF SUMMARY OF THE INVENTION

In view of the above-noted disadvantages, one of one of the objects of the present invention is to provide a gaming machine that can raise a player's interest in a game by carrying out diverse re-drawing in accordance with progress of the game.

A gaming machine has a display unit having a first display area adapted to displaying a plurality of types of symbols and a second display area adapted to displaying specific symbols that have specific interrelationships, a draw control unit that determines the specific symbols to display for a first game, wherein after the specific symbols are displayed in the first game, the draw control unit controls the display of the specific symbols in the second display area at determined times of subsequent the games, and determines areas in which the specific symbols are not displayed in the first display area and wherein the plurality of types of symbols displayed in the first display area are predetermined by the draw control unit as symbols that have no specific interrelationship.

In this way, in a case where a predetermined symbol is stopped in a plurality of display regions, the display regions that display the predetermined symbols are set as specific display regions. Because drawing at predetermined times of games after the first game is carried out from a plurality of types of symbols that are to be displayed, there is a specific relationship among the symbols in each game and the symbols having a predetermined relationship are displayed in the specific display region. By this, an independent drawing result (re-drawing result) which differs from the general display region, can be displayed in the specific display region. The display regions other than the specific display regions are set as general display regions. In the general display regions, because drawing is carried out from a plurality of types of symbols that are to be displayed without the symbols having a predetermined relationship, the general display regions and specific display regions are respectively independent and co-exist. Namely, re-drawing is not carried out using every region, but re-drawing result is displayed in the specific display regions, which are a part of the display regions, and in the region of a remaining part, ordinary drawing result is displayed. By this, because drawing results are displayed by two types of regions: the specific display regions and the ordinary display regions, existing, a new kind of game that arouses the player's interests can be realized. Every display region can become a specific display region, in accordance with the course of the game.

A gaming machine has a display unit that performs a flash display of symbols in which symbols are moved in a constant fashion in a plurality of display areas and subsequently stops movement of the symbols to display all or a portion of the symbols in a substantially stationary fashion, a draw control unit that determines specific symbols to be stopped in a specific display area for a first game, and wherein the specific symbols stopped in one of the display areas, are different types of the symbols from those in other display areas in a predetermined number of times after the specific symbols are displayed in the first game.

In this way, in a case where a predetermined symbol is stop displayed in a plurality of display regions, the display regions that stop display the predetermined symbols are set as specific display regions, and because drawing in a predetermined times of games after the first game is carried out from a plurality of types of symbols that are to be displayed, so that the symbols are displayed the same in each game, same symbols are displayed in the specific display region. By this, an independent re-drawing result which differs from the general display region can be displayed in the specific display region. The display regions other than the specific display regions are set as general display regions. In the general display regions, because drawing is carried out from a plurality of type of symbols that are to be displayed, so that symbols are independently displayed, the general display regions and specific display regions are respectively independent and co-exist. Namely, re-drawing is not carried out using every region, but re-drawing result is displayed in the specific display regions, which are a part of the display regions, and in the region of a remaining part, ordinary drawing result is displayed. By this, because drawing results are displayed by two types of regions: the specific display regions and the ordinary display regions, existing, a new kind of game that arouses the player's interests can be realized. Every display region can become a specific display region, in accordance with the course of the game.

The gaming machine has wherein when one of the symbols in the other display areas is the same type of symbol as displayed in the specific display area, the draw control unit changes the symbols in the other display areas to the specific symbols, and controls all of the specific symbols to be same type of the symbols in a predetermined number of times after modified.

In this way, in a case where a symbol to be displayed in whichever ordinary display region is the same symbol as the symbol that is to be displayed in the specific display region, because the ordinary display region that has drawn the same symbols as the symbol that is to be displayed in the specific display region is changed to the specific display region, in a predetermined number of feature games after the next time, the number of regions that structure the specific display region increases every time the same symbol is drawn in the ordinary display region. Then, because a drawing from a plurality of types of symbols is carried out so that a same symbol is stop displayed in every specific display region including the increased specific display region, the same symbol is stop displayed in the entire specific display region. By this, diverse re-drawing can be carried out in the specific display region. As a result, a strong impression is provided to the player, and it is possible to arouse the player's interest.

The gaming machine has wherein when the symbols in one of the other display areas are in a win situation, the draw control unit modifies one of the other display areas to another specific display area, modifies the symbols in the another specific display area to the specific symbols, and controls all of the specific symbols in the one of the other display areas, being same type of the symbols in a predetermined number of times after modified.

In this way, in a case where a symbol to be displayed in whichever ordinary display region adjacent to the specific display region is the same symbol as the symbol that is to be displayed in the specific display region, because the ordinary display region that is adjacent to the specific display region, and has drawn the same symbols as the symbol that is to be displayed in the specific display region is changed to the specific display region, in a predetermined number of feature games after the next time, the number of regions that structure the specific display region increases every time the same symbol is drawn in the ordinary display region that is adjacent to the specific display region. Then, because a drawing from a plurality of types of symbols is carried out so that a same symbol is stop displayed in every specific display region including the increased specific display region, the same symbol is stop displayed in the entire specific display region. By this, diverse re-drawing can be carried out in the specific display region. As a result, a strong impression is provided to the player, and it is possible to arouse the player's interest.

The gaming machine has wherein at least one of the other display areas is adjacent to the specific display area.

In this way, in a case where a win situation is established in whichever of a plurality of ordinary display regions, during a game of a predetermined number of times, because the ordinary display region that is to establish a win changes to another specific display region independent from the specific display region, the number of specific display regions increases every time a win situation is established in the ordinary display regions. Then, because a drawing from a plurality of types of symbols is carried out so that a same symbol is stop displayed in every specific display, the same symbol is stop displayed respectively in each specific display region, the same symbol is respectively stop displayed in each specific display region. By this, diverse re-drawing can be carried out in the specific display region. As a result, a strong impression is provided to the player, and it is possible to arouse the player's interest.

The gaming machine has wherein the win situation is established when special symbols are displayed in one of the other display areas.

In this way, in a case where a win situation is established in whichever of a plurality of ordinary display regions by a predetermined symbol being displayed, during a game of a predetermined number of times, because the ordinary display region that is to establish a win changes to another specific display region independent from the specific display region, the number of specific display regions increases every time a win situation is established in the ordinary display regions by a predetermined symbol being displayed. Then, because a drawing from a plurality of types of symbols is carried out so that a same symbol is stop displayed in every specific display, the same symbol is stop displayed respectively in each specific display region, the same symbol is respectively stop displayed in each specific display region. By this, diverse re-drawing can be carried out in the specific display region. As a result, a strong impression is provided to the player, and it is possible to arouse the player's interest.

The gaming machine has wherein the draw control unit controls all of the specific symbols in the specific display area and one of the other display areas, being same type of the 10 symbols in a predetermined number of times after modified.

By this structure, in a case where the symbol to be displayed in the specific display regions and the other specific display region are the same, drawing is carried out so that the same symbol is displayed in every specific display region. Namely, the specific display region and the other specific display region display the same symbols by combining, and becoming one specific display region. By this, diverse re-drawing can be carried out in the specific display region. For example, variation of the game activity can be possible by for example, increasing the dividend in accordance with the increase in number of the regions that constitute the specific display region, etc. As a result, the player's interests can be aroused.

A gaming machine has a display unit displaying a plurality of types of symbols, upon starting a game, a draw control unit predetermining a specific symbol display area where specific symbols that establish a plurality of specific prizes are displayed at predetermined times after starting the game, wherein the draw control unit selects the specific symbols for one of the plurality of specific prizes, from a prize group to which the one of the plurality of specific prizes belongs, and predetermines a general display area where other symbols are displayed, wherein the general display area displays the other symbols independently of the specific symbols in each game.

In this way, in a case where a predetermined symbol that establishes a specific win is stop displayed in a plurality of display regions, the display regions that stop display the predetermined symbols that establish a specific win are set as specific display regions in a predetermined times of games from the next game, and because drawing is carried out from a plurality of types of symbols that are to be displayed, so that which ever one win that is the same as a win group that the specific win group belongs to (the group to which the win belongs to) is established in each game, wins can be changed in each game, maintaining a win situation. By this, players feel intrigued, and can raise the player's interest towards the game. The display regions other than the specific display regions are set as general display regions. In the general display regions, because drawing is carried out from a plurality of type of symbols that are to be displayed, so that symbols are independently displayed, the general display regions and specific display regions are respectively independent and co-exist. Namely, re-drawing is not carried out using every region, but re-drawing result is displayed in the specific display regions, which are a part of the display regions, and in the region of a remaining part, ordinary drawing result is displayed. By this, because drawing results are displayed by two types of regions: the specific display regions and the ordinary display regions, existing, a new kind of game that arouses the player's interests can be realized. Every display region can become a specific display region, in accordance with the course of the game.

The gaming machine has wherein when one of the other symbols in the general display area adjacent to the specific display area is the same type of the specific symbols in the specific display area, the draw control unit modifies the general display area adjacent the specific display area correspond to the specific symbol display area, and controls all symbols in the specific symbol display area to establish a prize that belongs to different group from the one of the plurality of specific prizes.

In this way, in a case where a symbol to be displayed in whichever ordinary display region adjacent to the specific display region is the same symbol as the symbol that is to be displayed in the specific display region, because the ordinary display region that is adjacent to the specific display region, and has drawn the same symbols as the symbol that is to be displayed in the specific display region is changed to the specific display region, in a predetermined number of feature games after the next time, the number of regions that structure the specific display region increases every time the same symbol is drawn in the ordinary display region that is adjacent to the specific display region. Then, because a drawing from a plurality of types of symbols is carried out in every specific display region including the increased specific display region, so that at least one win among win groups different from win groups that the specific win belongs to in each game is established. Namely by the number of regions structuring the specific display region increasing, the grading of the wing groups are changed, and players alternate between hope and despair every time the number of regions increase. By this, it is possible to arouse the player's interests towards the game.

BRIEF DESCRIPTION OF THE DRAWINGS

These objects and other objects and advantages of the present invention will become more apparent upon reading of the following detailed description and the accompanying drawings in which:

FIG. 54 is a diagram showing a structure of wins of the gaming machine according to the ninth embodiment.

Figure 1:
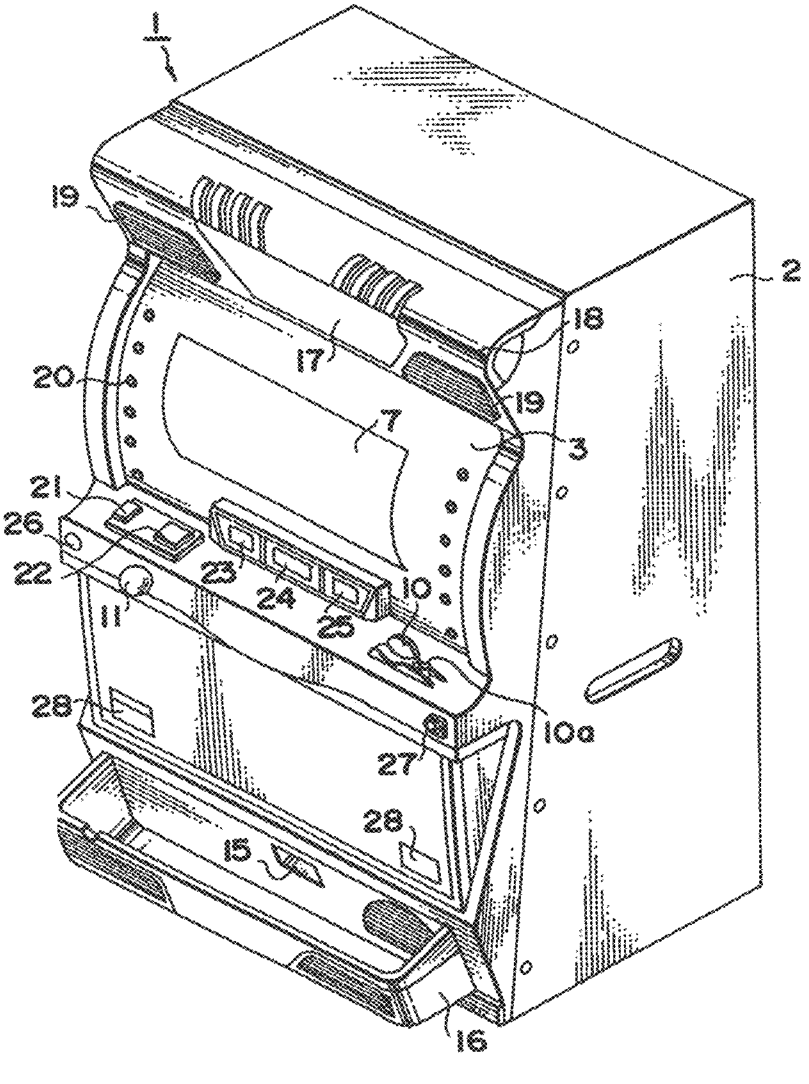
FIG. 1 is a perspective view of the exterior of a gaming machine according to a first embodiment.

DETAILED DESCRIPTION OF THE INVENTION (1) Definition of Re-Drawing Reel

The purpose pf re-drawing is to maintain an established win situation or a situation where particular symbols appear on the reel. One example is a case where three "cherry" symbols match on a slot machine. In this case, a win situation of "three matches" is established. Re-drawing maintains this win situation, and switches the kind of desired symbol to, for example "bar", and "7", etc. Also, re-drawing is to carry out re-drawing of symbols, maintaining a situation where same symbols appear in every position of up, middle, and down of the first to third reels, or maintaining a situation where same symbols appear in positions of each column, assuming that re-drawing is carried out in the first to third reels, in a five-reel slot machine. It is possible that the original symbol is re-drawn. In the case of "in a case where predetermined symbols are displayed stopped to a plurality of display regions, in a predetermined number of games after that game, in special display regions where the predetermined symbols are displayed, in at least game units, drawing is carried out from a plurality of kinds of symbols that are to be displayed having a predetermined relationship among the symbols", "predetermined relationship" corresponds to the above "established win situation, or a situation where symbols appear on the reels".

(2) Re-Drawing Reel

The re-drawing reel is for carrying out the above-discussed re-drawing. Symbol alignment of the re-drawing reel are all the same. By aligning the symbol alignment in a same position, and by rotating or stopping the reels, synchronizing timing and speed, the win situation can be maintained, and re-drawing of symbols can be carried out. A group of a plurality of re-drawing reels that maintain a common win situation will be described as "re-drawing reel group".

(3) Appearance of the Re-Drawing Reel

Appearance of the re-drawing reel is switching of an ordinary reel to a re-drawing reel under a condition that a certain setting condition is established. This setting condition can be for example, appearance of a predetermined symbol. Below, this predetermined symbol will be described as a "trigger symbol". Or, a situation where a predetermined win (for example "BAR-BAR-BAR" and "7-7-7", etc.), being established by a combination of symbols, can be the "condition" of above. Or, in a case where a poker game is carried out, one establishment of the winning combinations, such as shown in FIG. 54, can be the "condition" of above. In a case of a video slot, because the reel is drawn by program-like processing, switching of the reel is easy. Symbol alignment of the ordinary reel and the re-drawing reel may be different. In a case of a rotating drum type reel, because switching is physically difficult, in most cases, the alignment symbol of the ordinary reel and the re-drawing reel are the same. Therefore, "to synchronization control" or "not to synchronization control" becomes the difference in separating the ordinary reel and the re-drawing reel. By changing the symbol alignment and synchronization timing, a plurality of re-drawing reels can be made to appear at the same time.

(4) Increase of the Re-Drawing Reel

Increase of the re-drawing reel is carrying out the increase operation discussed, under the condition that some kind of setting condition is established. Here also, a predetermined symbol appearing, and a predetermined win situation being established by a combination of symbols, can be the setting condition. Also, for example, in a case where a poker game is carried out, one establishment of the winning combinations, such as shown in FIG. 54, can be the "condition" of above.

1. Increase in number of the re-drawing reels included in the re-drawing reel group
2. Increase in number of the re-drawing reel group itself Establishment of a win situation by a combination of a plurality of kinds of symbols may be the condition for the appearance of the re-drawing reel, or the increase of the re-drawing reel. For example, cases where combinations of symbols that express a specific meaning content, are displayed, such as “G” “0” “D” (GOD), and “C” “0” “I” “N” (COIN). The embodiments of the present invention will be described, with reference to the drawings.

(First Embodiment)

Figure 5:
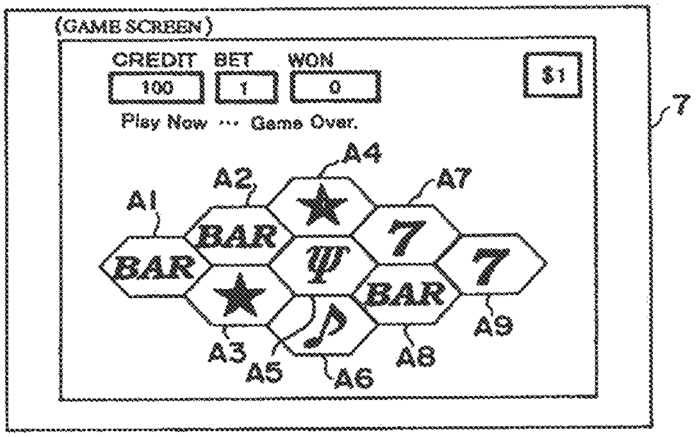
FIG. 5 is a diagram showing a screen display example of the gaming machine according to the first embodiment.
Figure 7:
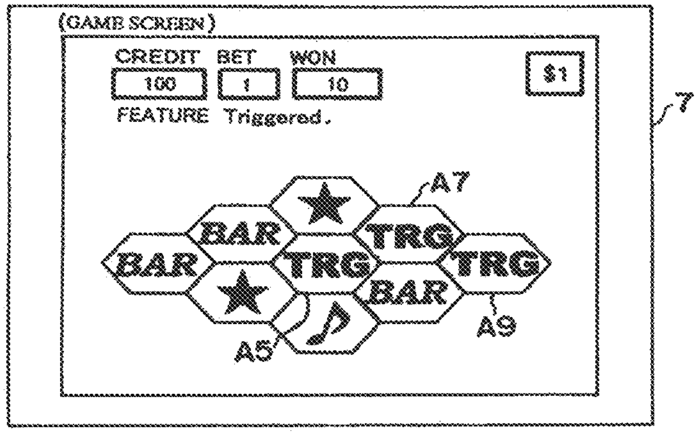
FIG. 7 is a diagram showing a screen display example of the gaming machine according to the first embodiment.

As shown in FIG. 5, a gaming machine according to the first embodiment, uses nine independent hexagon reels A1 to A9 that respectively have different symbol alignments. The hexagon reels A1 to A9 structure a display region. In this gaming machine, if three or more sides of hexagons of a same symbol are adjacent, when each reel stops, it is a win. As shown in FIG. 7, in a case where trigger symbols “TRG” are displayed stopped, at the same time win is established and a predetermined pay is carried out, for five next games, feature games are carried out. Feature games are so called free games, and a game starts without a BET.

In FIG. 7, reels (A5, A7, A9) where trigger symbols appear, are switched to re-drawing reels at a start of a feature game. This re-drawing reel has a same symbol alignment, and stops the symbols at the same position by synchronously rotating. The re-drawing reel structures a specific display region. The reels that are not a re-drawing reel, is an ordinary reel, and structures a general display region.

The reels that establish a win situation during a feature game is switched to a re-drawing reel, in a unit of a symbol according to the win situation. Therefore, each time a win situation occurs in the feature game, an independent new re-drawing reel is generated. A plurality of kinds of re-drawing reels independently rotate, and stop. However, in a case where a same symbol is displayed stopped in a plurality of kinds of re-drawing reels, those reels combine, and one re-drawing reel, wherein the number of reels is increased is generated. Below, the first embodiment will be described in detail.

Figure 6:
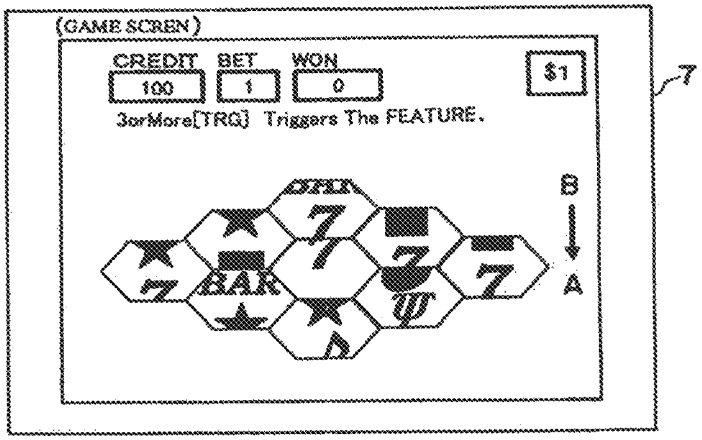
FIG. 6 is a diagram showing a screen display example of the gaming machine according to the first embodiment.

As shown in FIG. 1, a gaming machine 1 according to the first embodiment, comprises a chassis 2, and a front panel 3 in front of the chassis 2, which is attached so that it can be opened and closed. In the rear of the front panel 3, a symbol display unit 7 structured by a liquid crystal panel or a CRT (Cathode Ray Tube) is provided. In the first embodiment, the symbol display unit 7 adopts a video reel method, and displays nine hexagon reels A1 to A9, by executing a program. For example, FIG. 5 shows a wait state of an ordinary game, and FIG. 6 shows a state of changing display of symbols by each reel A1 to A9 rotating in a direction from B to A, in an ordinary game. The symbol display unit 7 includes trigger symbols and other kinds of symbols, and while it change displays a plurality of types of symbols column-wise, as above, it stop displays symbols of the change display, based on a result of an interior drawing.

In front of the chassis 2, a medal (the medal may be real money, such as a coin) slot 10, and a medal return button 10*a*, which returns the medal, in a case where the inserted medal is stuck, etc. A start lever 11 is for carrying out starting operation of a rotating display (change display) of the symbol display unit 7.

A game in the gaming machine 1 starts by a player carrying out a BET operation. The BET operation is carried out by credits or by inserting money. As above, a medal or a coin can be used, as having an equivalent value as money. BET operation can be possible by providing a device that receives inserting of bills, and a card reader/writer. After BET operation by a player, when the start lever 11 is operated, the symbol display unit 7 change displays the symbols. After a predetermined time has passed, the symbol display unit 7 sequentially stop displays the change-displayed symbols. The order for stopping may be that every reel stops at once, or the reels may be stopped in an order from reel A1 to A9. In a case of sequentially stopping, the reels can be stopped having a time interval of for example 0.5 seconds. When three or more predetermined symbols are adjacent at this stopped state, a win situation corresponding to that symbol is obtained.

On the lower side of the front panel 3, a medal pay-off opening 15 and a medal receiving tray 16 is provided, and on the upper side of the front panel 3, a game rendition indicator 17, which is driven for • game rendition is provided. The game rendition indicator 17 comprises for example LCD (Liquid Crystal Device) or various types of lamps. In the first embodiment, an embodiment where LCD is adopted is shown. On the upper side of the front panel 3, a bonus game indicator 18 is provided. The bonus game indicator 18 comprises LED (Light Emitting Diode), and displays, a winning state or a win of a feature game or a bonus prize, which provide a high game value to the player, rendition of a game, and error occurrence. A speaker 19 generates audio assist, music, and sound effects, etc.

A plurality of lamps 20 provided on the front panel 3 carries out displays concerning the game, such as display of a win situation line validated in accordance with the inserted number of medals (or number of credits that are BET), and display of a win situation, by turning on, turning off, or blinking the lamps 20. An accumulated metal inserting button 21 is a button for using a predetermined number of medals accumulated (credited) in a not shown medal accumulation device, and an accumulated metal inserting button 22 is a button for using a maximum specified number of medals accumulated in a not shown metal accumulation device. A medal accumulated number display unit 23 displays the number of medals accumulated in the not shown metal accumulation device. A win situation number display unit 24 displays number of times of win situation and number of times left, during a bonus prize of a win situation. A medal pay-off number display unit 25 comprises for example, LED. A pay off button 26 pays off the accumulated medals, and a locking mechanism 27 locks the door, by a rotating direction. A format of the gaming machine 1 and a name of a maker is written on a label 28.

Figure 2:
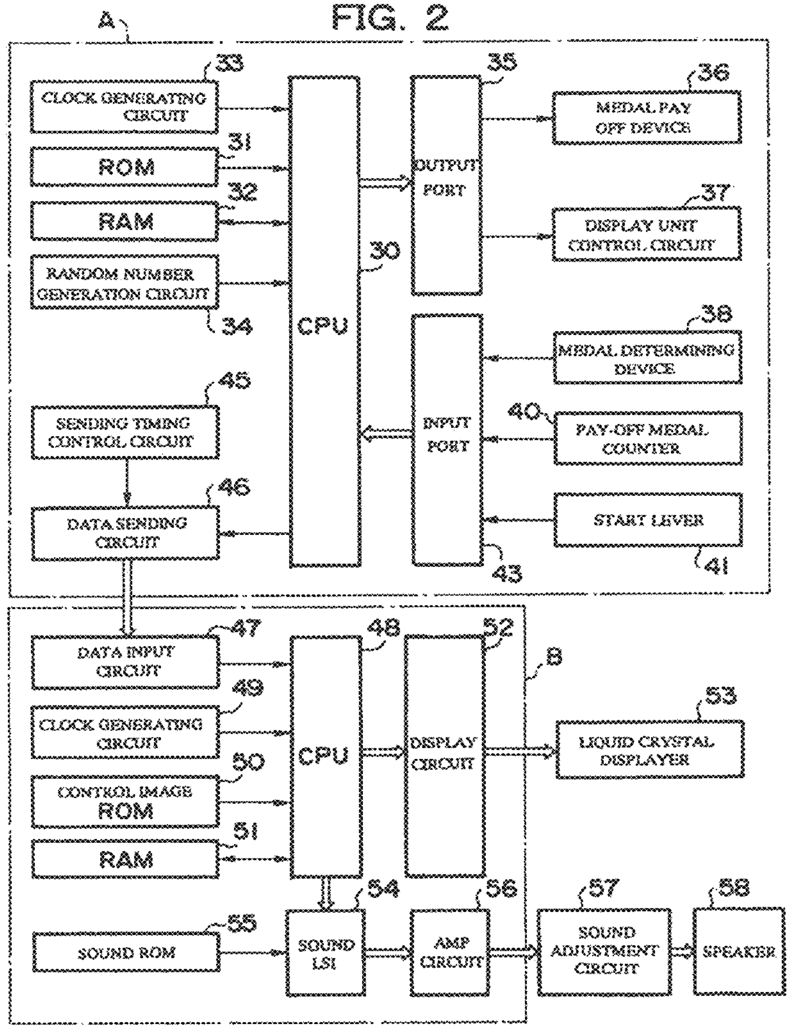
FIG. 2 is a diagram showing the electric structure of the gaming machine according to the first embodiment.

FIG. 2 is a diagram showing an electric structure of the gaming machine according to the first embodiment. As shown in FIG. 2, the gaming machine 1 electrically comprises a main substrate A and a sub substrate B. In the main substrate A, a CPU 30 comprises a ROM 31 and a RAM 32, and carries out control operation in accordance with a pre-set program. Besides a control program for controlling operation of the gaming machine 1, a win group drawing table used for carrying out pre-determination (internal drawing) of win groups, is stored in the ROM 31.

A clock generation circuit 33 which generates a standard clock pulse, and a random number generation circuit 34 which generates a certain number of random numbers, are connected to the CPU 30. The CPU 30, the ROM 31, the RAM 32, and the random number generation circuit 34 structure a drawing control unit. A control signal passed from the CPU 30 is output to a medal pay-off device 36 which carries out pay off of medals, and a display unit control circuit 37 which controls the symbol display unit 7 via an output port 35. The symbol display unit 7 and the display control circuit 37 structure the display unit.

A signal output from a medal determining device 38 which determines adequacy of a medal, a pay off medal counter 40 which counts the number of medals that are to be paid, and a start lever 41 which starts the rotation of the reels, is input to the CPU 30 via an input port 43. The signal output from the CPU 30 is output to the sub substrate B via a data sending circuit 46, receiving control from a sending timing control circuit 45 which controls signal sending timing to the sub substrate B.

In the sub substrate B, the signal output from the data sending circuit 46 is input to a data input circuit 47. The signal input to the data input circuit 47 is processed in a CPU 48. A clock generating circuit 49, a ROM 50 which has recorded various programs and image data, and a RAM 51 are connected to the CPU 48. Data concerning images is output to a liquid crystal displayer 53 via a display circuit 52 which carries out image processing, etc., from the CPU 48. In the liquid crystal displayer 53, characters, still images, and moving images, etc. are displayed. Data concerning sound is output to an amp circuit 56 via a sound LSI 54 which carries out sound processing, etc., from the CPU 48. The sound LSI 54 extracts necessary sound data from a sound ROM 55, and carries out processing of sound data. The sound data that receives processing of amplification, etc., by the amp circuit 56, is output to a speaker 58 via a sound adjustment circuit 57 which carries out adjustment of sound.

Figure 3:
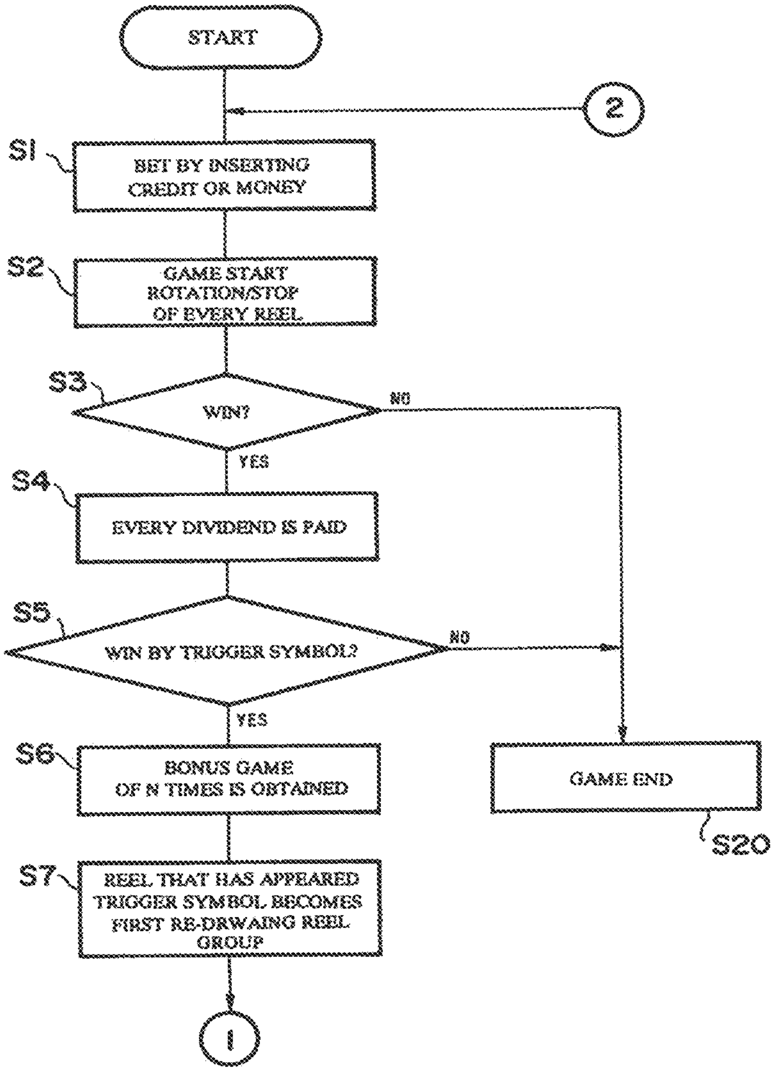
FIG. 3 is a flowchart showing performance of the gaming machine according to the first embodiment.
Figure 4:
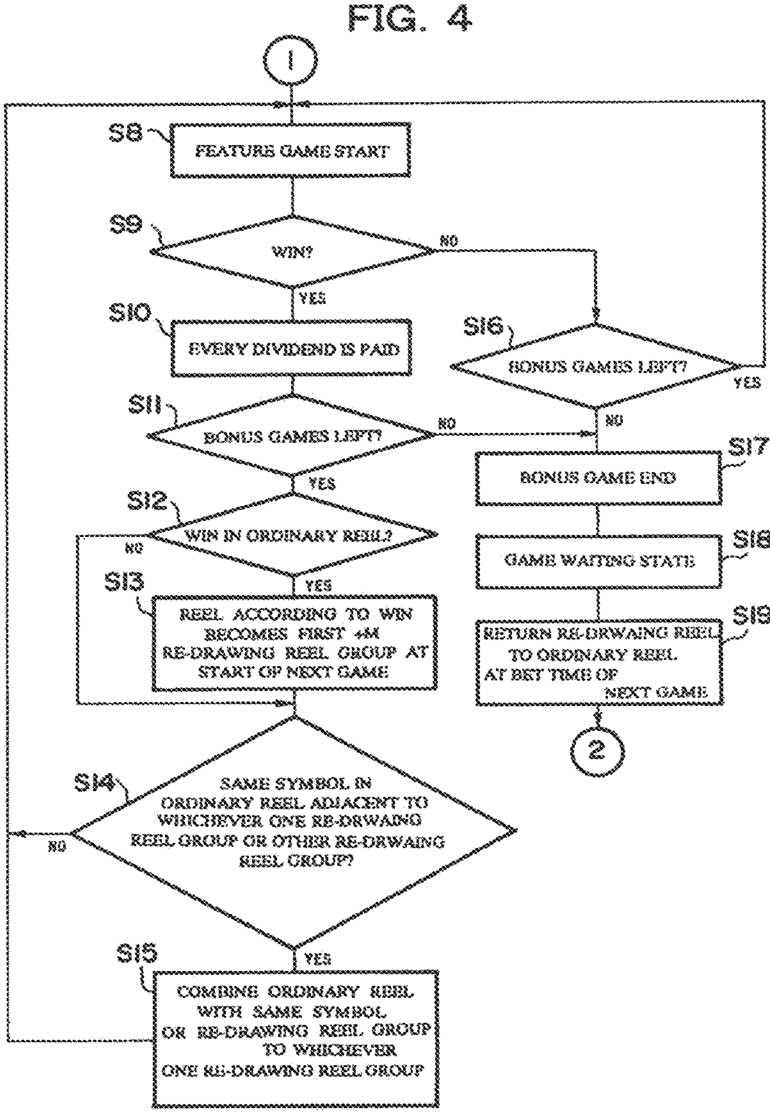
FIG. 4 is a flowchart showing performance of the gaming machine according to the first embodiment.

Performance of the gaming machine according to first embodiment structured as above, will be described with reference to FIGS. 3 to 12. FIGS. 3 and 4 are flowcharts showing main performance of the gaming machine according to the first embodiment, and FIGS. 5 to 12 are diagrams showing screen display examples. In a wait state of an ordinary game, a screen such as shown in FIG. 5 is displayed in the symbol display unit 7. Namely, reels A1 to A9 having a shape of a hexagon, which independently change or stop displays symbols, is displayed in a center part of a screen. Other than the reels A1 to A9, a credit meter which displays number of credits, a BET meter which displays number of BETs, and WON meter which indicates number of medals that are paid off to a player at a time of a win situation. In the first embodiment, as above, a win situation is established when three or more sides of hexagons of same symbols are adjacent, when each reel A1 to A9 stops.

In the flowchart shown in FIG. 3, when a player inserts credits or money (these can be medals, coins, or cards), and carries out BET operation (STEP S1), a game is started (Step S2). At the same time as start of the game, as shown in FIG. 6, each reel A1 to A9 rotates in a direction from B to A in FIG. 6, and change displays symbols. Here, symbol alignment and rotating timing of each reel A1 to A9 each differ. Therefore, while the reels are rotating, it is unlikely that one reel becomes the same situation as another reel. Each reel A1 to A9 stops at predetermined timing, after a predetermined time has passed after starting rotation.

In the flowchart shown in FIG. 3, it is determined whether a win situation is established or not (Step S3). In a case where a win situation is not established, the game ends (Step S20), and in a case where a win situation is established, every dividend corresponding to that win is paid (Step S4). The dividend at this time, is determined in accordance with the BET situation. Then, it is determined whether the win is a win situation established by the trigger symbol (Step S5). In a case where the win situation is not established by the trigger symbol, the game ends (Step S20).

On the other hand, as shown in FIG. 7, in a case where a win situation is established by trigger symbols being adjacent at three sides of hexagons in reels A5, A7, and A9, a feature game as a bonus game is started. Namely, the feature game is carried out in a case where three ore more trigger symbols are adjacent. The number of times of the feature game is n (n is a natural number) times from the next game. In the first embodiment, the number of times of the feature game is five times (Step S6).

Reels A5, A7, and A9 that have displayed trigger symbols when a first feature game is started, are switched to re-drawing reels (Step S7). The reels A5, A7, and A9 that become re-drawing reels are called a “first re-drawing reel group” as one group. Symbol alignment is the same, and synchronously rotates and stops at the same position on the reel in each reel A5, A7, and A9 which structure the re-drawing reel group.

By this, an independent re-drawing result, which differs from the ordinary reel, can be displayed to the re-drawing reel group. Because a plurality of symbols are drawn for the ordinary reels where trigger symbols are not displayed, so that arbitrary symbols are independently displayed, the ordinary reels and the re-drawing reels are respectively independent, and mixed. Namely, re-drawing is not carried out using every region, but a re-drawing result is displayed in the re-drawing reels that are a part of the display regions, and in another one part of the region, the ordinary drawing result is displayed. By this, because two types of regions, the ordinary reels and the re-drawing reels coexist, and display drawing results, a new kind of game which arouses the player’s interests, can be realized. Every display region may be a re-drawing reel (specific display region) in accordance with process of the game.

Figure 8:
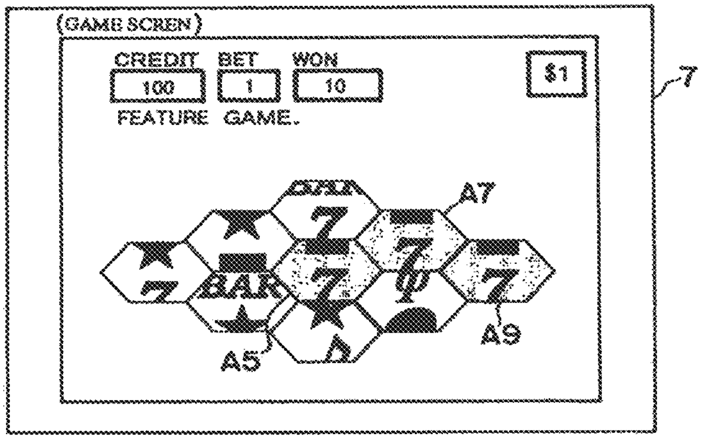
FIG. 8 is a diagram showing a screen display example of the gaming machine according to the first embodiment.
Figure 9:
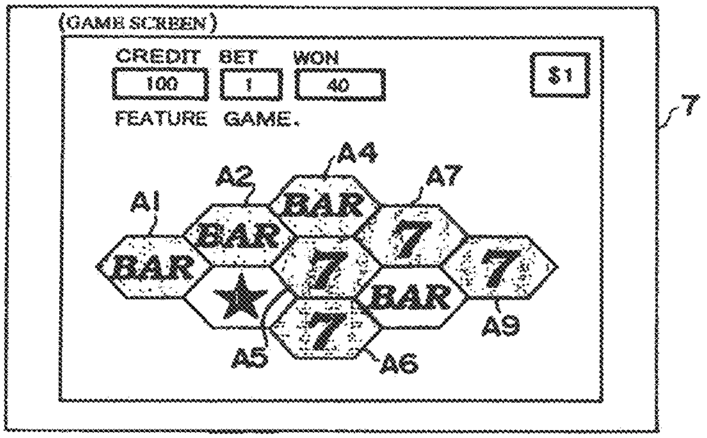
FIG. 9 is a diagram showing a screen display example of the gaming machine according to the first embodiment.

In the flowchart shown in FIG. 4, a feature game (bonus game) is started (Step S8). As shown in FIG. 8, the first re-drawing reel group (A5, A7, and A9) synchronously rotates, and the other reels independently rotate randomly. When the rotation of every ordinary reel and the first re-drawing reel group stops, it is determined whether a win situation is established or not (Step S9). In a case where a win situation is not established, the flow forwards to Step S 16, and as shown in FIG. 9, in a case where a win situation is established, every dividend is paid (Step S 10). The dividend at this time is set in accordance with the BET state. In FIG. 9, a win situation is established by the “BAR” symbols matching in adjacent reels A1, A2, and A4. Also, a win situation is established by “7” symbols matching in adjacent reels A6, A5, A7, and A9.

Then, it is determined whether there are any feature games (bonus games) left (Step S 11). In a case where there aren’t any feature games left, the flow forwards to Step S17, and in a case where there are feature games left, it is determined whether a win situation is established in the ordinary reels (Step S12). In Step S12, in a case where a win situation is not established in the ordinary reels, the flow forwards to Step S14, and in a case where a win situation is established in the ordinary reels, the reels according to the win situation becomes a first +$m^{th}$ (m is a natural number) re-drawing reel group (Step S 13). In this case, it becomes a second re-drawing reel group.

In this way, during the period of a feature game, in a case where a win situation is established in whichever of the plurality of, ordinary reels, because the ordinary reels involved in the win situation are changed to new reels, independent from the existing reels, each time a win situation is established in the ordinary reels, the number of re-drawing reel groups increases. Because drawing is carried out from a plurality of types of symbols so that the same symbols are respectively stop displayed in each re-drawing reel group, diverse re-drawing can be carried out in each re-drawing reel group. As a result, a strong impression is provided to the players, and is possible to arouse the player's interests.

Then, it is determined whether there are any same symbols in whichever one of the re-drawing reel groups and an adjacent ordinary reel, or in another re-drawing reel group (Step S14). In a case where there isn't this kind of symbol, the flow forwards to Step S8, and in a case where there is this kind of symbol, the ordinary reel or the re-drawing reel group that has displayed the same symbols is combined to one re-drawing reel group (Step S 15). Namely, as shown in FIG. 9, the reel A6 is adjacent to the first re-drawing reel group A5, A7, and A9, and has displayed a same symbol "7", the reel A6 is switched to a re-drawing reel, and structures the first re-drawing reel. Therefore, reels A5, A6, A7, and A9 have the same symbol alignment, and synchronously rotates and stops at the same position.

In this way, in a case where a symbol displayed in whichever ordinary reel is the same symbol as the symbol displayed in the re-drawing reel group, because the ordinary reel is changed to a re-drawing reel and is combined to the existing re-drawing reel group, in a predetermined number of feature games after the next time, the number of reels that structure the re-drawing reel group increases. Then, because a drawing from a plurality of types of symbols is carried out so that a same symbol is stop displayed in every re-drawing reel group, the same symbol is stop displayed in the entire re-drawing reel group. By this, diverse re-drawing can be carried out in the specific display region, a strong impression is provided to the player, and it is possible to arouse the player's interest.

Figure 10:
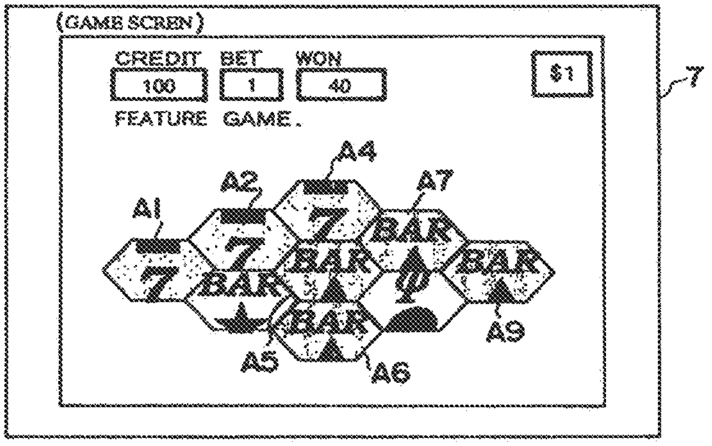
FIG. 10 is a diagram showing a screen display example of the gaming machine according to the first embodiment.
Figure 11:
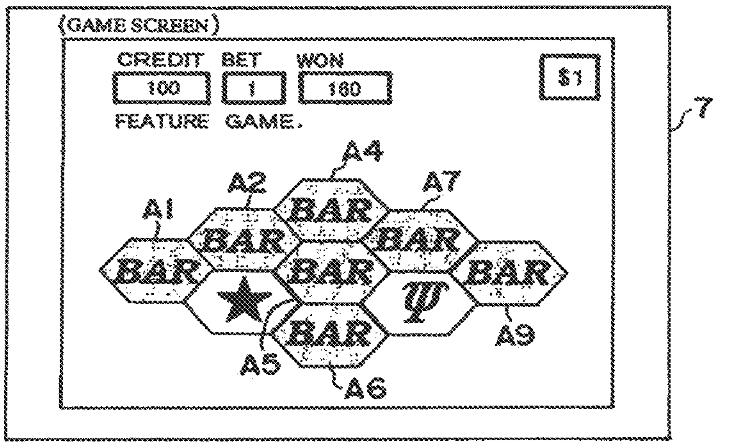
FIG. 11 is a diagram showing a screen display example of the gaming machine according to the first embodiment.

Next, the flow returns to Step S8, and a second feature game (bonus game) is carried out. Here, as shown in FIG. 10, the first re-drawing reel group (A5, A6, A7, and A9) that has the number of reels increased, the second re-drawing reel group (A1, A2, and A4), and the other ordinary reels (A3, and A8) respectively rotate independently. When every ordinary reel and re-drawing reel stops, it is determined whether a win situation is established or not (Step S9). For example, as shown in FIG. 11, in a case where a win situation is established in the first re-drawing reel group (A5, A6, A7, and A9), by a "BAR" symbol matching, and a win situation is established in the second re-drawing reel group (A1, A2, and A4), by the "BAR" symbol matching, dividend is paid (Step S 10), and it is determined whether there are any feature games (bonus games) left (Step S11). In a case where a feature game is left, it is determined whether a win situation is established, and when a win situation is not established, the flow forwards to Step S14, and when a win situation is established in the ordinary reels, the reels according to the win situation becomes a first +$m^{th}$ (m is a natural number) re-drawing reel group (Step S 13). The case shown in FIG. 11, is a situation where a win situation is not established in the ordinary reels.

Then, it is determined whether there are any same symbols in whichever one of the re-drawing reel groups and an adjacent ordinary reels, or in another re-drawing reel group (Step S14). For example, in FIG. 11, the same "BAR" symbol is displayed in the first re-drawing reel group (A5, A6, A7, and A9), and the second re-drawing reel group (A1, A2, A4). Therefore, the first and second re-drawing reels are combined to form a new reel group (a new re-drawing reel group) (Step S15). Namely, as shown in FIG. 11, reels (A1, A2, A4, A5, A6, A7, and A9) structure a new re-drawing reel group.

Figure 12:
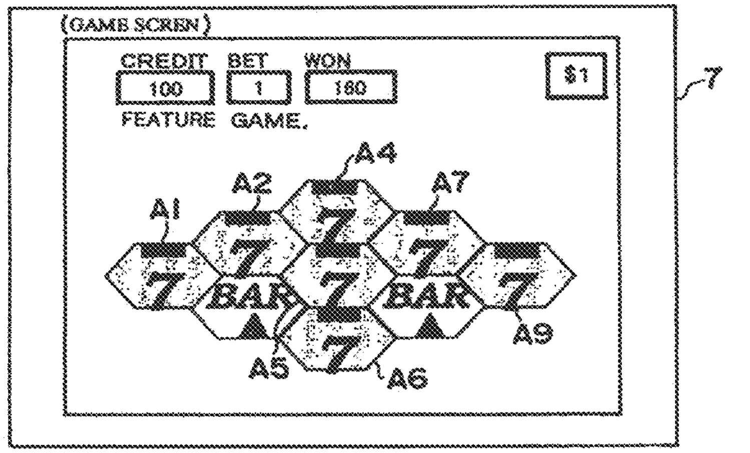
FIG. 12 is a diagram showing a screen display example of the gaming machine according to the first embodiment.

In the next game, as shown in FIG. 12, a new re-drawing reel group (A1, A2, A4, A5, A6, A7, and A9) and the ordinary reels (A3 and A8) respectively rotate independently.

In this way, in a case where the symbols displayed in each re-drawing reel group are the same, the re-drawing reel groups combine, and becomes one re-drawing reel group, and displays the same symbol. By this, diverse re-drawing can be carried out in the re-drawing reel. For example, by raising the odds, accompanying the increase in number of the re-drawing reels, the player's interests can be aroused.

As the above, a third to fifth feature game is carried out. Namely, in Step S9, in a case where a win situation is not established, it is determined whether a feature game (bonus game) is left (Step S 16), and in a case where there is a feature game (bonus game) left, the flow forwards to Step S8. On the other hand, in Step S16, in a case where there isn't a feature game (bonus game) left, the flow forwards to Step S17. In Step S11, in a case where there isn't a feature game (bonus game) left, the feature game (bonus game) ends (Step S 17), and moves to a game waiting state (Step S18). At the • BET time of the next game, the re-drawing reel is retuned to an ordinary reel (Step S19). From the next game, an ordinary game is carried out once again.

(Second Embodiment)

Figure 15:
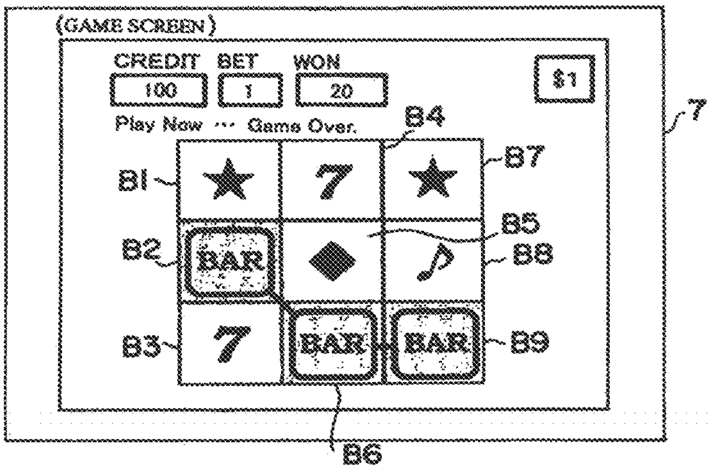
FIG. 15 is a diagram showing a screen display example of the gaming machine according to the second embodiment.

In the second embodiment, a symbol display unit 7 displays a screen, such as shown in FIG. 15. Namely, as shown in FIG. 15, in an ordinary game, nine independent reels B1 to B9 having a quadrangle shape, wherein alignment of symbols each differ, are displayed. The reels B1 to B9 structure a display region. In the second embodiment, if a same symbol is adjacent in three or more sides or corners of the reels B1 to B9, when each reel stops, it is a win. Hardware structure of the gaming machine according to the second embodiment, is the same as that of the first embodiment.

Figure 13:
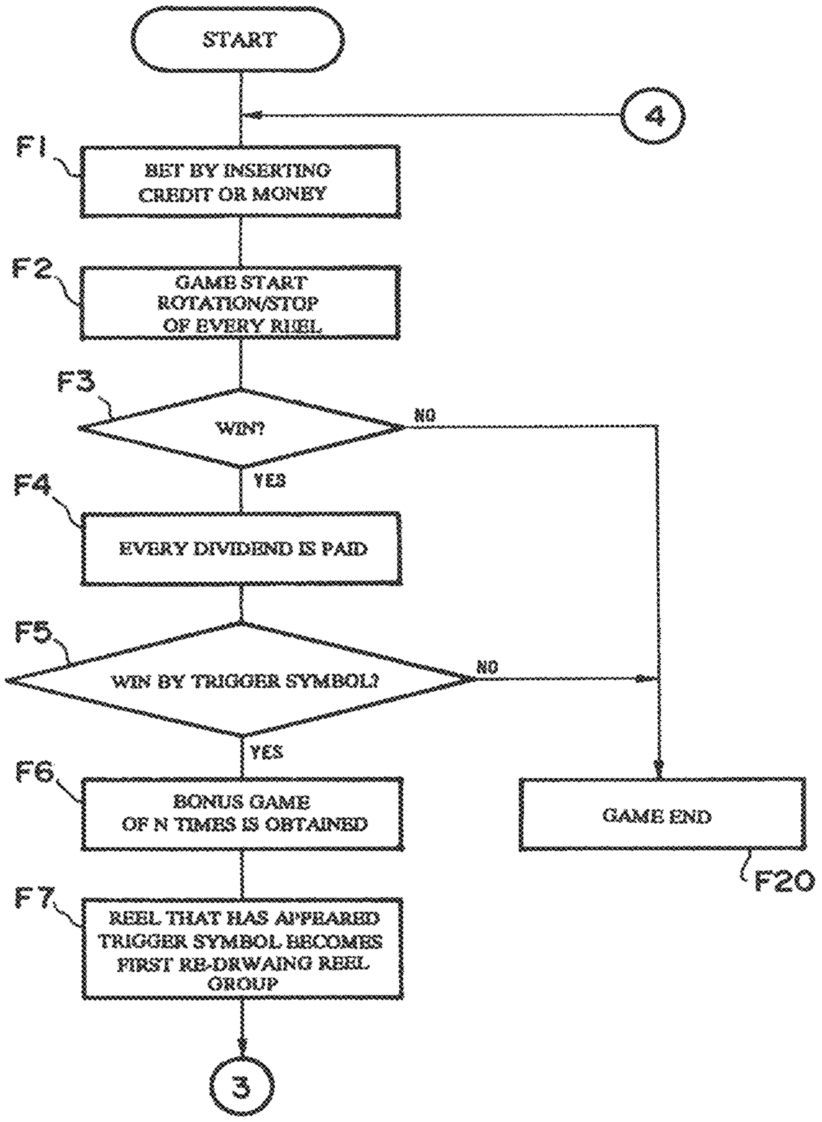
FIG. 13 is a flowchart showing performance of a gaming machine according to a second embodiment.

Performance of the gaming machine according to the second embodiment, will be described with reference to FIGS. 13 and 14. In the flowchart shown in FIG. 13, when a player inserts credits or money (these can be medals, coins, or cards), and carries out BET operation (STEP F1), a game is started (Step F2). At the same time as start of the game, each reel B1 to B9 rotates, and change displays symbols. Each reel B1 to B9 stops at predetermined timing, after a predetermined time has passed after starting rotation.

Then, it is determined whether a win situation is established or not (Step F3). In a case where a win situation is not established, the game ends (Step F20), and in a case where a win situation is established, every dividend corresponding to that win is paid (Step F4). The dividend at this time, is determined in accordance with the BET situation. For example, as shown in FIG. 15, in a case where a symbol "BAR" is adjacent in three reels B2, B6, and B9, a win situation is established by the "BAR".

Figure 16:
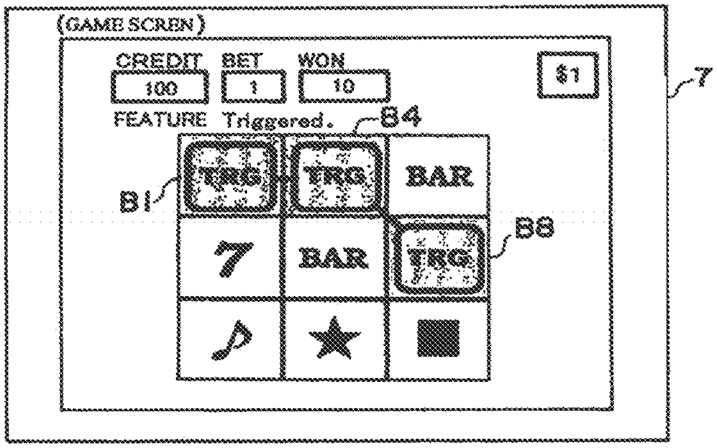
FIG. 16 is a diagram showing a screen display example of the gaming machine according to the second embodiment.

Then, it is determined whether the win is a win situation established by the trigger symbol (Step F5). In a case where the win situation is not established by the trigger symbol, the game ends (Step F20). On the other hand, as shown in FIG. 16, in a case where a win situation is established by three or more trigger symbols "TRG" being adjacent in reels B 1, B4, and B8, dividend is provided to the player, and a feature game as a bonus game starts.

Namely, the feature game is carried out in a case where a win situation is established by three ore more trigger symbols being adjacent. In the second embodiment, the number of times of the feature game is five times (Step F6). When the first free game is started, reels B1, B4, and B8 that have trigger symbols displayed, is switched to re-drawing reels (Step F7). The reels B1, B4, and B8 that become re-drawing reels are called a “first re-drawing reel group” as one group. In the same way as the first embodiment, symbol alignment is the same, and synchronously rotates and stops at the same position on the reel in each reel B1, B4, and B8 which structure the re-drawing reel group.

Figure 14:
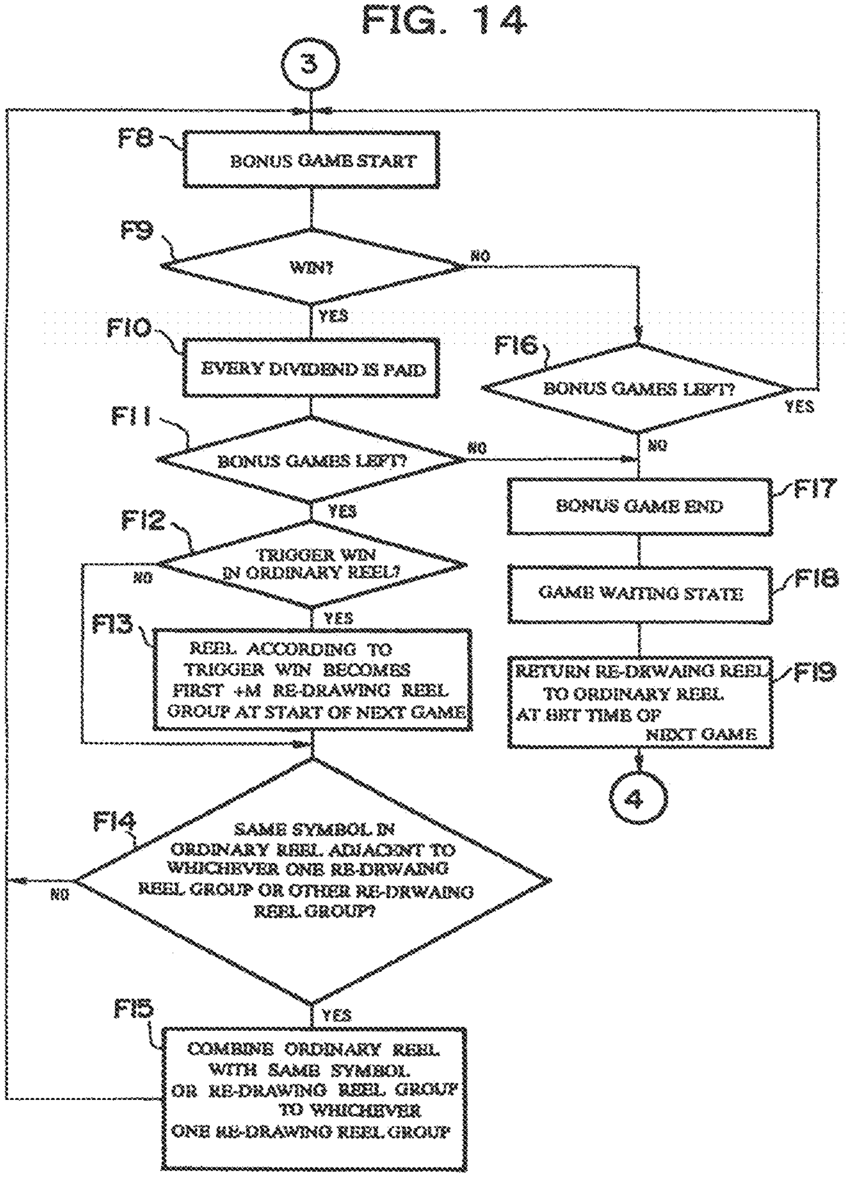
FIG. 14 is a flowchart showing performance of the gaming machine according to the second embodiment.
Figure 17:
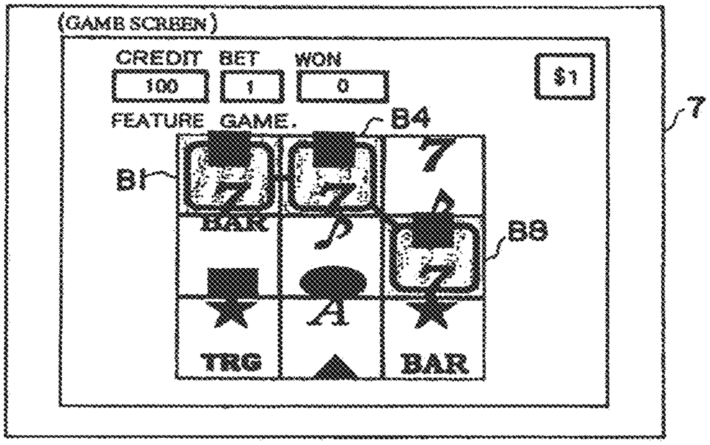
FIG. 17 is a diagram showing a screen display example of the gaming machine according to the second embodiment.
Figure 18:
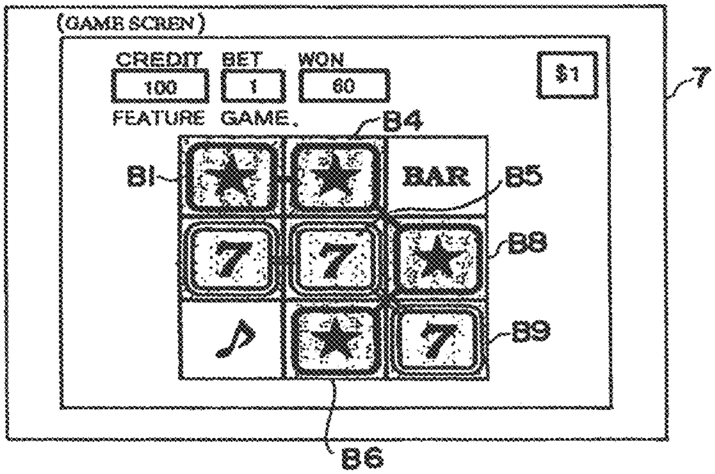
FIG. 18 is a diagram showing a screen display example of the gaming machine according to the second embodiment.

In the flowchart shown in FIG. 14, a feature game (bonus game) is started (Step F8). As shown in FIG. 17, the first re-drawing reel group (B1, B4, and B8) and other ordinary reels rotate in a direction from B to A in the drawings, but the first re-drawing reel group (B 1, B4, and B8) synchronously rotates. The ordinary reels (B2, B3, B5, B6, B7, and B9) respectively rotate randomly, independently. When the rotation of every ordinary reel and the first re-drawing reel group stops, it is determined whether a win situation is established or not (Step F9). In a case where a win situation is not established, the flow forwards to Step F16, and as shown in FIG. 18, in a case where a win situation is established, every dividend is paid (Step F10). The dividend at this time is set in accordance with the BET state.

For example, in FIG. 18, because four “0” symbols are displayed in the first re-drawing reel group (B1, B4, and B8) and the adjacent reel B6, a win situation by four same symbols being adjacent, is established. In the ordinary reels (B2, B5, and B9), a win situation is established by three “7” symbols being adjacent.

Then, it is determined whether there are any feature games (bonus games) left (Step F1 1). In a case where there aren’t any feature games left, the flow forwards to Step F17, and in a case where there are feature games left, it is determined whether a win situation is established in the ordinary reels by a trigger symbol (Step F12). In Step F12, in a case where a win situation is not established in the ordinary reels by the trigger symbol, the flow forwards to Step F14, and in a case where a win situation is established in the ordinary reels by the trigger symbol, the reels according to the win situation becomes a first +m$^{th}$ (m is a natural number) re-drawing reel group (Step F13).

Then, it is determined whether there are any same symbols in whichever one of the re-drawing reel groups and an adjacent ordinary reel, or in another re-drawing reel group (Step F14). In a case where there isn’t these kinds of symbols, the flow forwards to Step F8, and in a case where there are theses kind of symbols, the ordinary reel or the re-drawing reel group that has displayed the same symbols is combined to one re-drawing reel group (Step F15).

For example, in FIG. 18, because the same symbol “0” as displayed in the first re-drawing reel group (B1, B4, and B8) is displayed in reel B6, which is adjacent to the first re-drawing reel group, the reel B6 is combined to the first re-drawing reel group. Namely, the first re-drawing reel group is structured by reels B1, B4, B6 and B8. These reels have a same symbol alignment, and stops the symbol alignment in each reel, by synchronously rotating. On the other hand, in FIG. 18, a win situation is established by three “7” symbols being adjacent. However, because it is not a win situation by the trigger symbol, these ordinary reels (B2, B5, B9) do not change to re-drawing reels.

Figure 19:
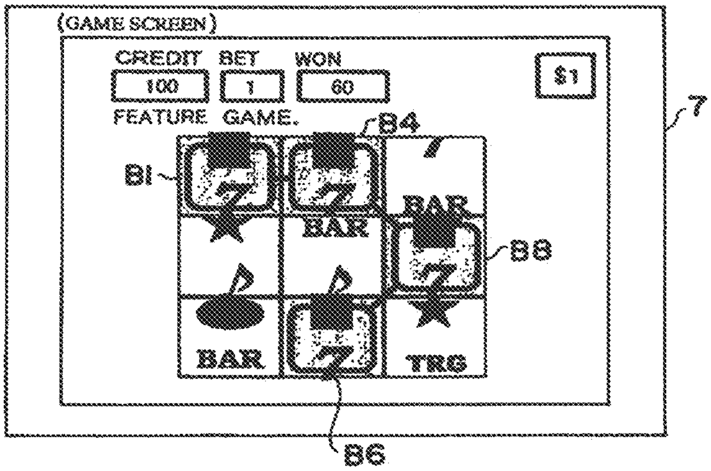
FIG. 19 is a diagram showing a screen display example of the gaming machine according to the second embodiment.
Figure 20:
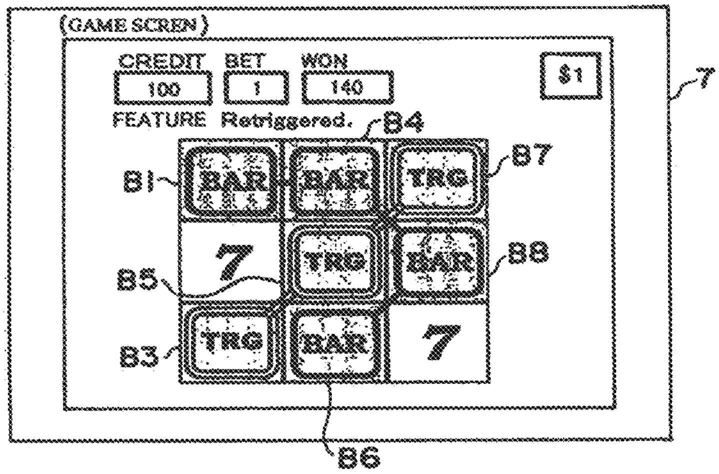
FIG. 20 is a diagram showing a screen display example of the gaming machine according to the second embodiment.

Next, the flow returns to Step F8, and a second feature game (bonus game) is carried out. Here, as shown in FIG. 19, the first re-drawing reel group (B1, B4, B6, and B8) that has the number of reels increased, and the other ordinary reels (B2, B3, B5, B7, and B9) respectively rotate independently. When every ordinary reel and re-drawing reel stops, it is determined whether a win situation is established or not (Step F9). For example, as shown in FIG. 20, in a case where a win situation is established in the first re-drawing reel group (B1, B4, B6, and B8), by a “BAR” symbol matching, and a win situation is established in the ordinary reels (B3, B5, and B7) by the “BAR” symbol matching, dividend is paid (Step F10), and it is determined whether there are any feature games (bonus games) left (Step F1 1). In a case where a feature game is left, it is determined whether a win situation is established by the trigger symbol, and when a win situation is not established, the flow forwards to Step F14, and when a win situation is established in the ordinary reels by the trigger symbol, the reels according to the win situation becomes a first +'nth (m is a natural number) re-drawing reel group (Step F13). Here, because a win situation is established in the ordinary reels (B3, B5, and B7) by the trigger symbol, a second re-drawing reel is structured by these reels (B3, B5, and B7).

In this way, during the period of a feature game, in a case where a win situation is established in whichever of the plurality of ordinary reels, by the trigger symbol being displayed, because the ordinary reels involved in the win situation are changed to independent reels other than the existing re-drawing reels, each time a win situation is established in the ordinary reels by the trigger symbol, the number of re-drawing reel groups increases. Because drawing is carried out from a plurality of types of symbols so that the same symbols are respectively stop displayed in each re-drawing reel group, the same symbol is respectively stop displayed in the re-drawing reel groups. By this, diverse re-drawing can be carried out in each—re-drawing reel group. As a result, a strong impression is provided to the players, and it is possible to arouse the player’s interests.

Figure 21:
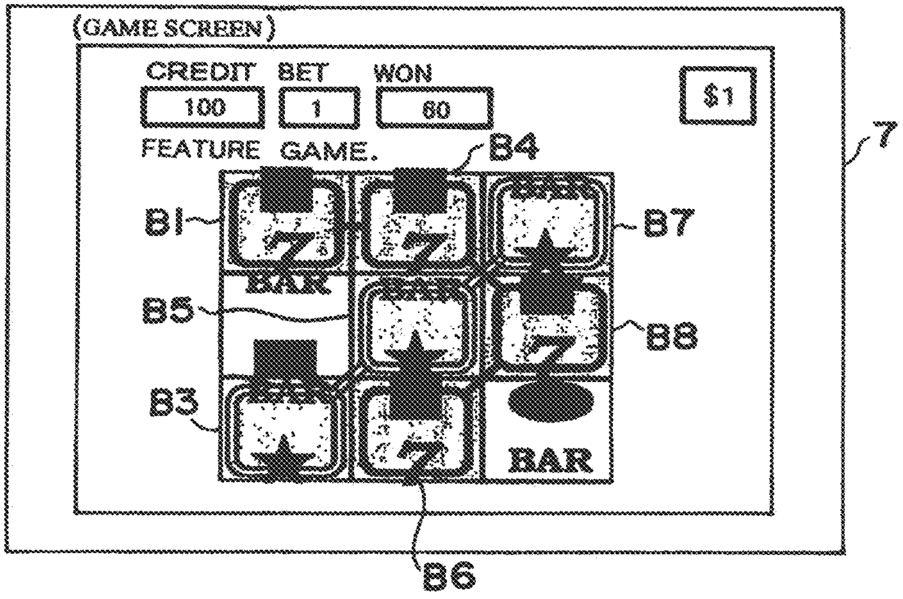
FIG. 21 is a diagram showing a screen display example of the gaming machine according to the second embodiment.

Then, it is determined whether there are any same symbols in whichever one of the re-drawing reel groups and an adjacent ordinary reel, or in another re-drawing reel group (Step F14). In a case where there isn’t this kind of symbol, the flow forwards to Step F8, and in a case where there is this kind of symbol, as above, the symbols are combined to the re-drawing reel group (Step F15). In the case shown in FIG. 20, this kind of symbol does not exist Next, in the third feature game, as shown in FIG. 21, the first re-drawing reel group (B1, B4, B6, and B8), the second re-drawing reel group (B3, B5, and B7), and the ordinary reels (B2, and B9) respectively rotate independently (Step F8).

When every ordinary reel and re-drawing reel stops, it is determined whether a win situation is established or not (Step F9). In a case where there is no win situation, the flow forwards to Step F16, and in a case where a win situation is established, every dividend is paid (Step F10). The dividend at this time is set in accordance with the BET state. Then, it is determined whether there are any feature games (bonus-games) left (Step F1 1). In a case where there aren’t any feature games left, the flow forwards to Step F17, and in a case where there are feature games left, it is determined whether a win situation is established in the ordinary reels by the trigger symbol (Step F12). In Step F12, in a case where a win situation is not established in the ordinary reels by the trigger symbol, the flow forwards to Step F14, and in a case where a win situation is established in the ordinary reels by the trigger symbol, the reels according to the win situation becomes a first +m$^{th}$ (m is a natural number) re-drawing reel group (Step F13).

Figure 22:
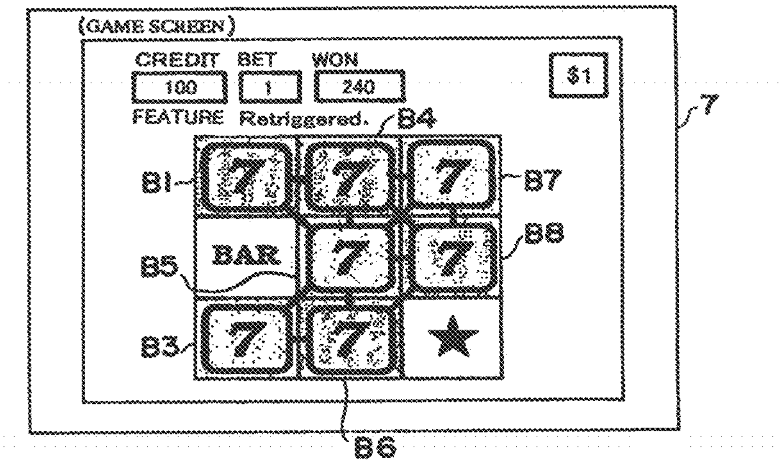
FIG. 22 is a diagram showing a screen display example of the gaming machine according to the second embodiment.
Figure 23:
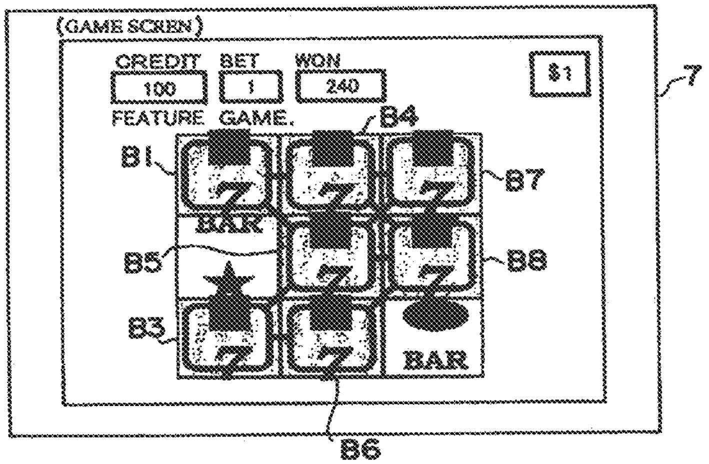
FIG. 23 is a diagram showing a screen display example of the gaming machine according to the second embodiment.

Then, it is determined whether there are any same symbols in whichever one of the re-drawing reel groups and an adjacent ordinary reel, or in another re-drawing reel group (Step F14). As shown in FIG. 22, when a same symbol “7” is displayed in the first re-drawing reel group (B1, B4, B6, and B8), and the second re-drawing reel group (B3, B5, and B7), the first and the second re-drawing reel group combines, and generates one re-drawing reel group. In the fourth feature game, as shown in FIG. 23, the re-drawing reels group structured by reels (B1, B3, B4, B5, B6, B7, and B8), and the ordinary reels (B2, and B5) independently rotate from a direction of B to A in FIG. 23.

In Step F9, in a case where a win situation is not established, it is determined whether a feature game (bonus game) is left, and in a case where there is a feature game (bonus game) left, the flow forwards to Step F8, and games are carried out until the number of feature games reaches a predetermined number (five times). In a case where there isn't a feature game (bonus game) left. In step S11, in a case where there isn't a feature game (bonus game) left, the feature game (bonus game) ends (Step F17), and moves to a game waiting state (Step F18). At the BET time of the next game, the re-drawing reel is retuned to an ordinary reel (Step F19). From the next game, an ordinary game is carried out once again.

In this way, in a case where the symbols displayed in each re-drawing reel group are the same, the re-drawing reel groups combine, and become one re-drawing reel group, and displays the same symbol. By this diverse re-drawing can be carried out in the re-drawing reel. For example, by raising the odds, accompanying the increase in number of the re-drawing reels, the player's interests can be aroused.

(Third Embodiment)

In the third embodiment, a win situation is established, in a case where three or more same symbols are adjacent in an ordinary game. In a case where a win situation is established by three trigger symbols being adjacent, feature games (bonus games) are carried out five games, after that game. In these feature games, reels where the trigger symbols appeared in the ordinary game, are switched to re-drawing reels. In a case where the same symbol is displayed in an ordinary reel that is adjacent to the re-drawing reels, the ordinary reel is combined to the re-drawing reels. Namely, the number of reels that structure the re-drawing reels increase. During the period of the feature game, a win situation by the trigger symbol, does not occur. The hardware structure of the gaming machine according to the third embodiment, can be structured in the same way as the first embodiment.

The performance of the gaming machine according to the third embodiment, will be described with reference to the flowcharts of FIGS. 24 and 25. In a waiting state of an ordinary game, a screen such as shown in FIG. 5 is displayed. Namely, reels A1 to A9 that have hexagon shapes, and which independently change or stop displays a symbol, is displayed in the center part of the screen. Other than that, a credit meter which displays number of credits, a BET meter which displays number of BETs, and WON meter which indicates the number of medals to be paid to a user, at a win situation are displayed. In the third embodiment, as above, a win situation is established when three or more sides of hexagons of a same symbol are adjacent, when each reel A1 to A9 stops.

Figure 24:
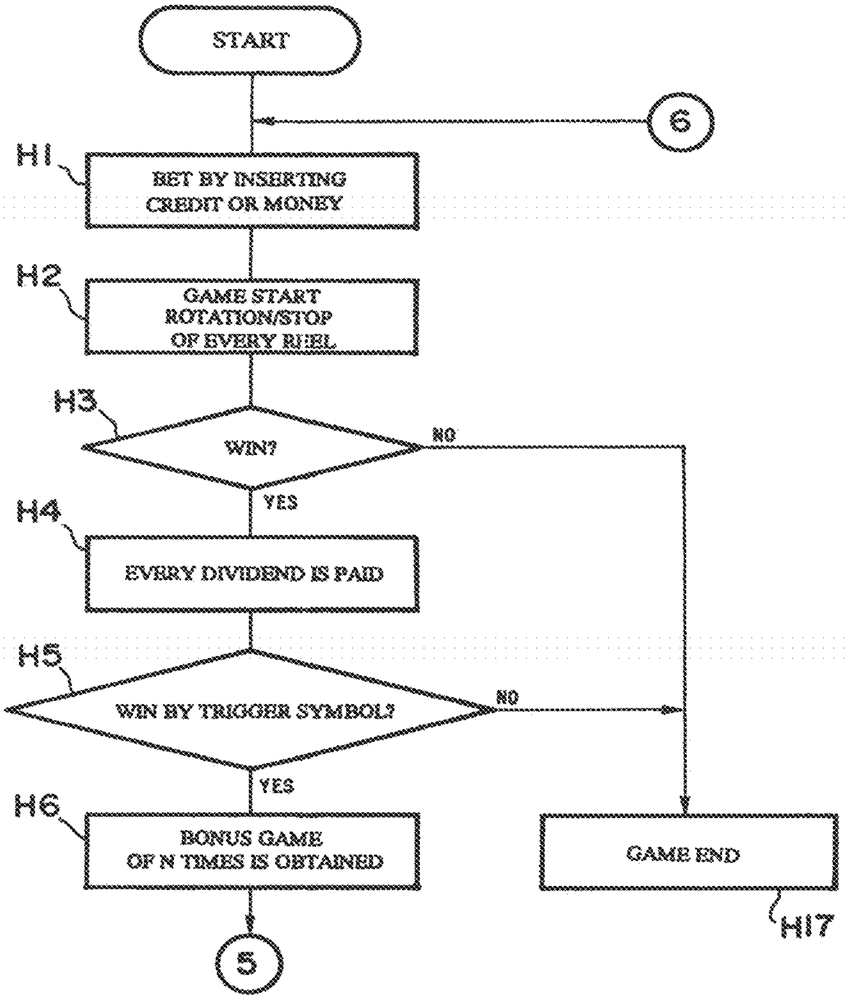
FIG. 24 is a flowchart showing performance of a gaming machine according to a third embodiment.

In the flowchart shown in FIG. 24, when a player inserts credits or money (these can be medals, coins, or cards), and carries out BET operation (STEP H1), a game is started (Step H2). At the same time as start of the game, as shown in FIG. 6, each reel A1 to A9 rotates in a direction from B to A in FIG. 6, and change displays symbols. Here, symbol alignment and rotating timing of each reel A1 to A9 differ. Therefore, while the reels are rotating, it is unlikely that one reel becomes the same situation as another reel. Each reel A1 to A9 stops at predetermined timing, after a predetermined time has passed after starting rotation.

In the flowchart shown in FIG. 24, it is determined whether a win situation is established or not (Step H3). In a case where a win situation is not established, the game ends (Step H17), and in a case where a win situation is established, every dividend corresponding to that win is paid (Step H4). The dividend at this time, is determined based on the BET situation. Then, it is determined whether the win is a win situation established by the trigger symbol (Step H5). In a case where the win situation is not established by the trigger symbol, the game ends (Step H17).

On the other hand, as shown in FIG. 7, in a case where a win situation is established by trigger symbols being adjacent at three sides of hexagons in reels A5, A7, and A9, a feature game as a bonus game is started. Namely, the feature game is carried out in a case where three ore more trigger symbols are adjacent. The number of times of the feature game is n (n is a natural number) times from the next game. In the third embodiment, as above, the number of times of the feature game is five times (Step H6).

Figure 25:
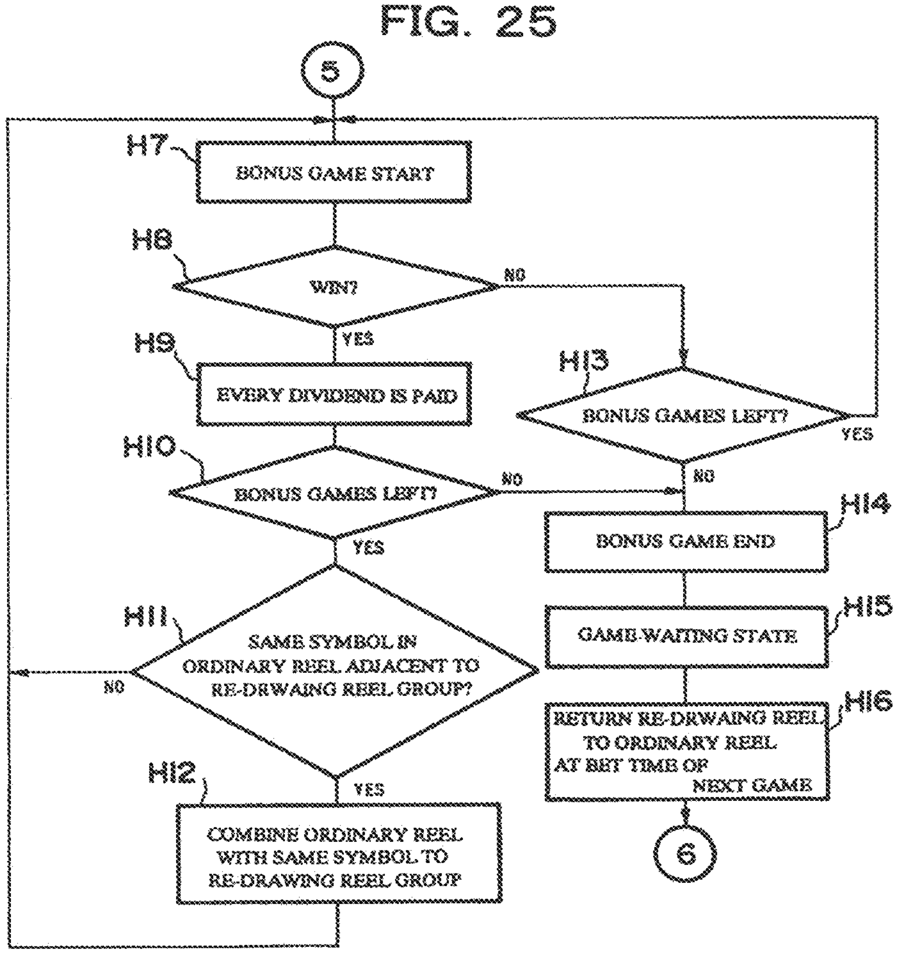
FIG. 25 is a flowchart showing performance of the gaming machine according to the third embodiment.

In the flowchart shown in FIG. 25, when a first feature game (bonus game) is started (Step H7), reels A5, A7, and A9 that have displayed trigger symbols, are switched to re-drawing reels. The reels A5, A7, and A9 that become re-drawing reels are called a "re-drawing reel group" as one group. Each reel A5, A7, and A9 that structures the re-drawing reel group have the same symbol alignment, and synchronously rotates and stops at the same position on the reel. For example, as shown in FIG. 8, the re-drawing reel group (A5, A7, A9) synchronously rotates, and the other reels independently rotate randomly. When rotation of every ordinary reel and re-drawing reel group stops, it is determined whether a win situation is established (Step H8). In a case where a win situation is not established, the flow forwards to Step H13, and as shown in FIG. 9, in a case where a win situation is established, every dividend is paid (Step H9). The dividend at this time is determined in accordance with the BET state. In FIG. 9, a win situation is established by "BAR" symbols matching in adjacent reels A1, A2, and A4. Also, a win situation is established in adjacent reels A6, A5, A7, and A9, by "7" symbols matching.

In the fourth embodiment, in a case where a win situation is established by three trigger symbols being adjacent, feature games (bonus games) are carried out five games after that game. At the starting time of these feature games, reels where the trigger symbols appeared in the ordinary game, are switched to re-drawing reels. In a case where the same symbol is displayed in an ordinary reel that is adjacent to the re-drawing reels, the ordinary reel is combined to the re-drawing reels. Namely, the number of reels that structure the re-drawing reels increase. In a case where a plurality of re-drawing reels exist, when a same symbol is displayed in adjacent re-drawing groups, the re-drawing groups are combined, and become one re-drawing reel group. Further, in the fourth embodiment, differing from the third embodiment, a win situation is established by a trigger symbol, during the period of the feature game, and the number of feature games is added by that win. Namely, every time a win situation is established by the trigger symbol, during the period of the feature game, the number of feature games increase. In the feature game, in a case where a win situation is established in an ordinary reel by the trigger symbol, the ordinary reel according to that win, is switched to an independent re-drawing reel, which differs from the existing re-drawing reels. The hardware structure of the gaming machine according to the fourth embodiment, can be structured in the same way as the second embodiment.

Next, performance of the gaming machine according to the fourth embodiment will be described with reference to the flowcharts of FIG. 26 and FIG. 27. In the flowchart shown in FIG. 26, a feature game (bonus game) is started (Step T3). As shown in FIG. 17, the first re-drawing reel group (B1, B4, and B8) and other ordinary reels rotate in a direction from B to A in the drawings, but the first re-drawing reel group (B1, B4, and B8) synchronously rotates. The ordinary reels (B2, B3, B5, B6, B7, and B9) respectively rotate randomly, independently. When the rotation of every ordinary reel and the first re-drawing reel group stops, it is determined whether a win situation is established or not (Step T4). In a case where a win situation is not established, the flow forwards to Step T13, and as shown in FIG. 18, in a case where a win situation is established, every dividend is paid (Step T5). The dividend at this time is set in accordance with the BET state. Here, for example, in FIG. 18, because four "0" symbols are displayed in the first re-drawing reel group (B1, B4, and B8) and the adjacent reel B6, a win situation by four same symbols being adjacent, is established. In the ordinary reels (B2, B5, and B9), a win situation is established by three "7" symbols being adjacent.

Then, it is determined whether there are any feature games (bonus games) left (Step T6). In a case where there aren't any feature games left, and a win situation by the trigger symbol is not established, the flow forwards to Step T14, and in a case where there are feature games left, or a win situation by the trigger symbol is established, it is determined whether there are any same symbols in whichever one of the re-drawing reel groups and an adjacent ordinary reels (Step T7). In a case where there isn't this kind of symbol, the flow forwards to Step T9, and in a case where there is this kind of symbol, the ordinary reel that has displayed the same symbols is combined to the re-drawing reels (Step T8).

For example, in FIG. 18, because the same symbol "0" as displayed in the first re-drawing reel group (B1, B4, and B8) is displayed in reel B6, which is adjacent to the first re-drawing reel group, the reel B6 is combined to the first re-drawing reel group. Namely, the first re-drawing reel group is structured by reels B1, B4, B6 and B8. These reels have a same symbol alignment, and stops the symbol alignment in each reel, by synchronously rotating.

Then, it is determined whether the symbols in adjacent re-drawing reel groups are the same or not (Step T9). In a case where the symbols are not the same in the adjacent re-drawing reel groups, the flow forwards to Step T11, and in a case where the symbols are the same in the adjacent re-drawing reel groups, the re-drawing groups that have displayed the same symbol, are combined to one re-drawing reel group (Step T10).

Next, it is determined whether a win situation is established by the trigger symbol (Step T12). In a case where a win situation is not established by the trigger symbol, the flow forwards to step T3, and in a case where a win situation is established by the trigger symbol, a feature game (bonus game) of an addition of n times is added to the player. The number of additional games can be for example, five times.

Figure 26:
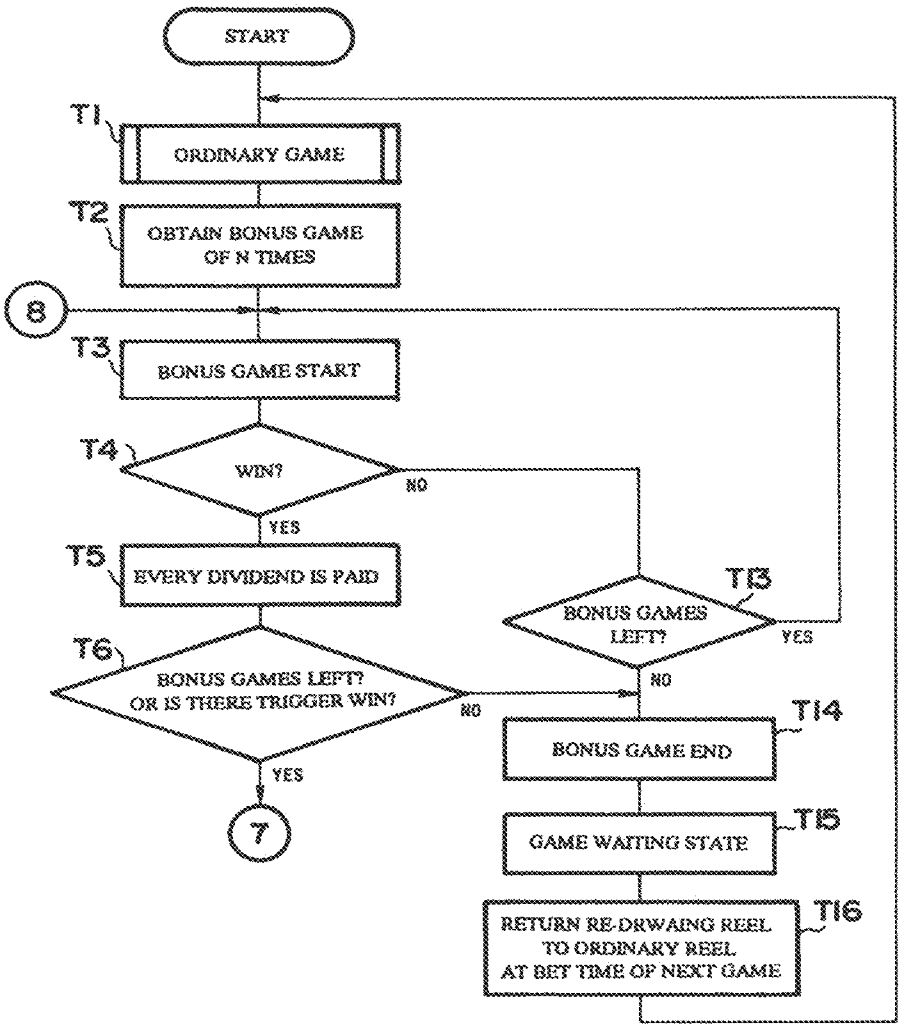
FIG. 26 is a flowchart showing performance of a gaming machine according to a fourth embodiment.
Figure 27:
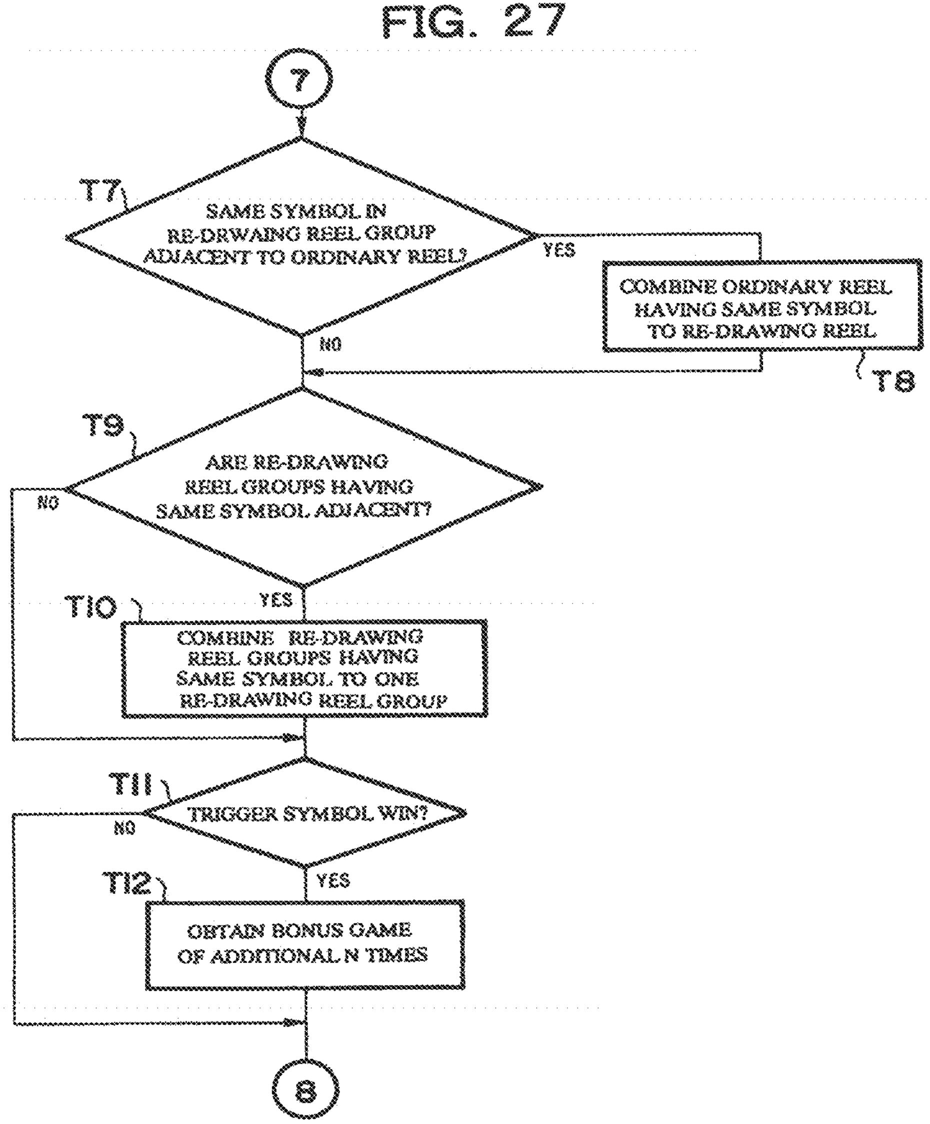
FIG. 27 is a flowchart showing performance of the gaming machine according to the fourth embodiment.

The flow returns to Step T3 in FIG. 26, and a second feature game (bonus game) is carried out. Here, as shown in FIG. 19, the first re-drawing reel group (B1, B4, B7, and B9) that has the number of reels increased, and the other ordinary reels (B2, B3, B5, B7, and B9) respectively rotate independently. When every ordinary reel and re-drawing reel stops, it is determined whether a win situation is established or not (Step T4). For example, as shown in FIG. 20, in a case where a win situation is established in the first re-drawing reel group (B 1, B4, B6, and B8), by a "BAR" symbol matching, and a win situation is established in the ordinary reels (B3, B5, and B7) by the "BAR" symbol matching, dividend is paid (Step T5), and it is determined whether there are any feature games (bonus games) left, or whether there is a win situation by the trigger symbol (Step T6). In a case where a feature game is left, or in a case where there is a win situation by the trigger symbol, it is determined whether there is a same symbol in the ordinary reels adjacent to the re-drawing reel group (Step T7).

In Step T7, in a case where there isn't a same symbol in the ordinary reels adjacent to the re-drawing reel group, the flow forwards to Step T9, and in a case where there is a same symbol in an ordinary reel adjacent to the re-drawing reel group, the ordinary reel that has displayed the same symbol, is combined to the re-drawing reel group (Step T8). Then, it is determined whether re-drawing reel groups that have the same symbol are adjacent or not (Step T9). In a case where there are no adjacent re-drawing reel groups, the flow forwards to step T11. On the other hand, in a case where there are adjacent re-drawing reel groups, the re-drawing reel groups are combined to one re-drawing reel group (Step T10).

It is determined whether a win situation is established by the trigger symbol (Step T12). In a case where a win situation is not established by the trigger symbol, the flow forwards to Step T3, and in a case where a win situation is established by the trigger symbol, the player obtains feature games (bonus games) of an additional n times (Step T12). For example, in FIG. 20, because a win situation is established in the ordinary reels (B3, B5, B7), by the trigger symbol, a second re-drawing reel group is structured by reels B3, B5, and B7.

In a third feature game, as shown in FIG. 21, the first re-drawing reel group (B 1, B4, 30 B6, and B8), the second re-drawing reel group (B3, B5, and B7), and the ordinary reels (B2 and B9) respectively rotate independently (Step F8).

When rotation of every reel stops, it is determined whether there—is a win situation or not (Step F9). In a case where a win situation is not established, the flow forwards to Step T13, and in a case where a win situation is established, every dividend corresponding to that win is paid (Step F5). The dividend at this time, is determined based on the BET situation. Then, it is determined whether there are any feature games (bonus games) left, or whether a win situation is established by the trigger symbol (Step T6). In a case where there aren't any feature games (bonus games) left and a win situation is not established by the trigger symbol, the flow forwards to Step T14. On the other hand, in a case where feature games (bonus games) are left, or a win situation is established by a trigger symbol, it is determined whether there is a same symbol in the ordinary reels adjacent to the re-drawing reel (Step T7). In a case where there isn't a same symbol in the ordinary reels adjacent to the re-drawing reel group, the flow forwards to Step T9, and in a case where there is a same symbol in an ordinary reel adjacent to the re-drawing reel group, the ordinary reel is combined to the re-drawing reel group (Step T8). Then, it is determined whether a same symbol is displayed in adjacent re-drawing reel groups (Step T10). As shown in FIG. 22, when a same symbol "7" is displayed in the first re-drawing reel group (B1, B4, B6, and B8), and the second re-drawing reel group (B3, B5, and B7), the first and the second re-drawing reel group combines, and one re-drawing reel group is generated. Next, it is determined whether a win situation is established by the trigger symbol (Step Ti), and in a case where a win situation is not established by the trigger symbol, the flow forwards to Step T3, and in a case where a win situation is established by the trigger symbol, bonus games of an additional n times is provided to the player (Step T12). Then, the flow forwards to Step T3.

In the fourth feature game, as shown in FIG. 23, the re-drawing reels group structured by reels (B1, B3, B4, B5, B6, B7, and B8), and the ordinary reels (B2, and B5) independently rotate from a direction of B to A in FIG. 23.

In Step T4, in a case where a win situation is not established, it is determined whether a feature game (bonus game) is left (Step T13), and in a case where there is a feature game (bonus game) left, the flow forwards to Step T3, and games are carried out until the number of feature games reaches a predetermined number. In a case where there isn't a feature game (bonus game) left, the flow forwards to Step T14. In Step T6, in a case where there isn't a feature game (bonus game) left, and there isn't a win situation by the trigger symbol, the feature game (bonus game) ends (Step T14), and moves to a game waiting state (Step T15). At the BET time of the next game, the re-drawing reel is retuned to—an ordinary reel (Step T16). From the next game, an ordinary game is carried out once again.

(Fifth Embodiment)

In the fifth embodiment, a win situation is established, in a case where three or more same symbols are adjacent in an ordinary game. In a case where a win situation is established by three trigger symbols being adjacent, feature games (bonus games) are carried out five games after that game. In these feature games, reels where the trigger symbols appeared in the ordinary game, are switched to re-drawing reels. In a case where the same symbol is displayed in an ordinary reel that is adjacent to the re-drawing reels, the ordinary reel is combined to the re-drawing reels. Namely, the number of reels that structure the re-drawing reels increases. In a case where a plurality of re-drawing reels exist, when a same symbol is displayed in adjacent re-drawing groups, the re-drawing groups are combined, and becomes one re-drawing reel group. During the period of the feature game, a win situation by the trigger symbol, does not occur. The hardware structure of the gaming machine according to the fifth embodiment, can be structured in the same way as the first embodiment.

The performance of the gaming machine according to the third embodiment, will be described with reference to the flowcharts of FIGS. 28 and 29. In a waiting state of an ordinary game, a screen such as shown in FIG. 5 is displayed in the symbol display unit 7. Namely, reels A1 to A9 that have hexagon shapes, and which independently change or stop displays a symbol, is displayed in the center part of the screen. Other than that, a credit meter which displays number of credits, a BET meter which displays number of BETs, and a WON meter which indicates the number of medals to be paid to a user, at a win situation. In the fifth embodiment, as above, a win situation is established when three or more sides of hexagons of a same symbol are adjacent, when each reel A1 to A9 stops.

Figure 28:
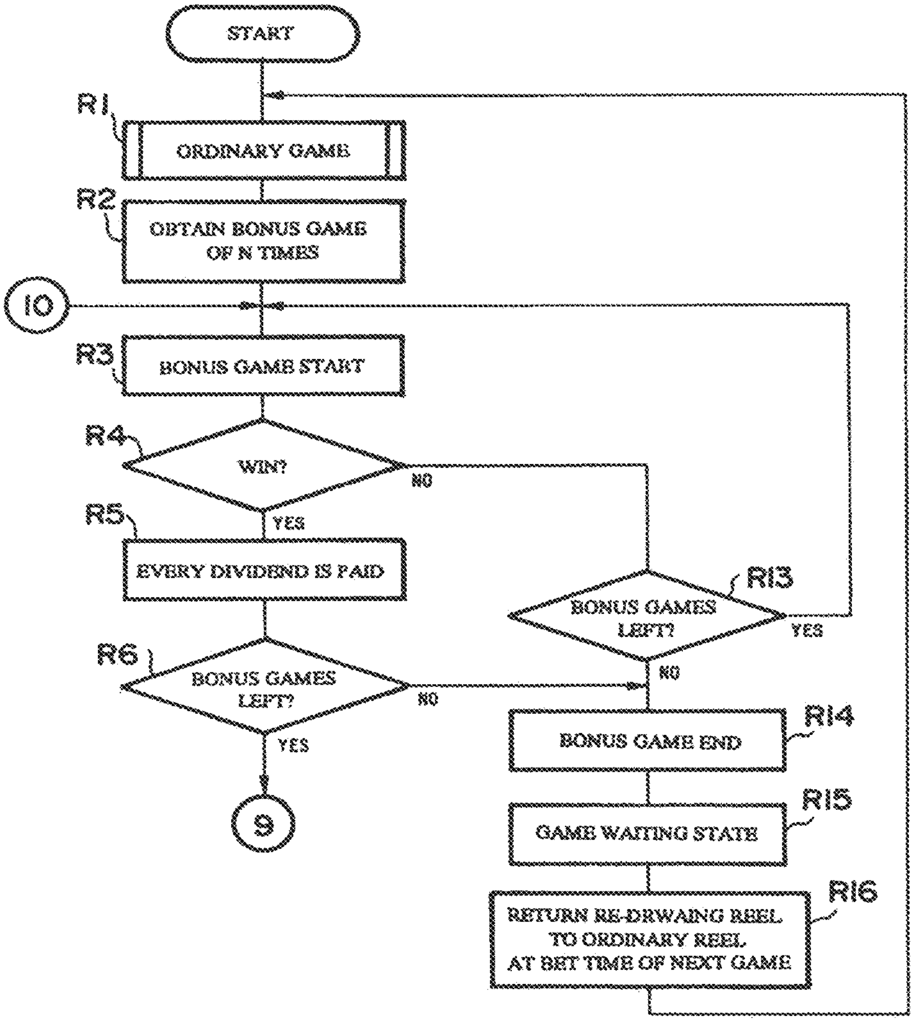
FIG. 28 is a flowchart showing performance of a gaming machine according to a fifth embodiment.
Figure 29:
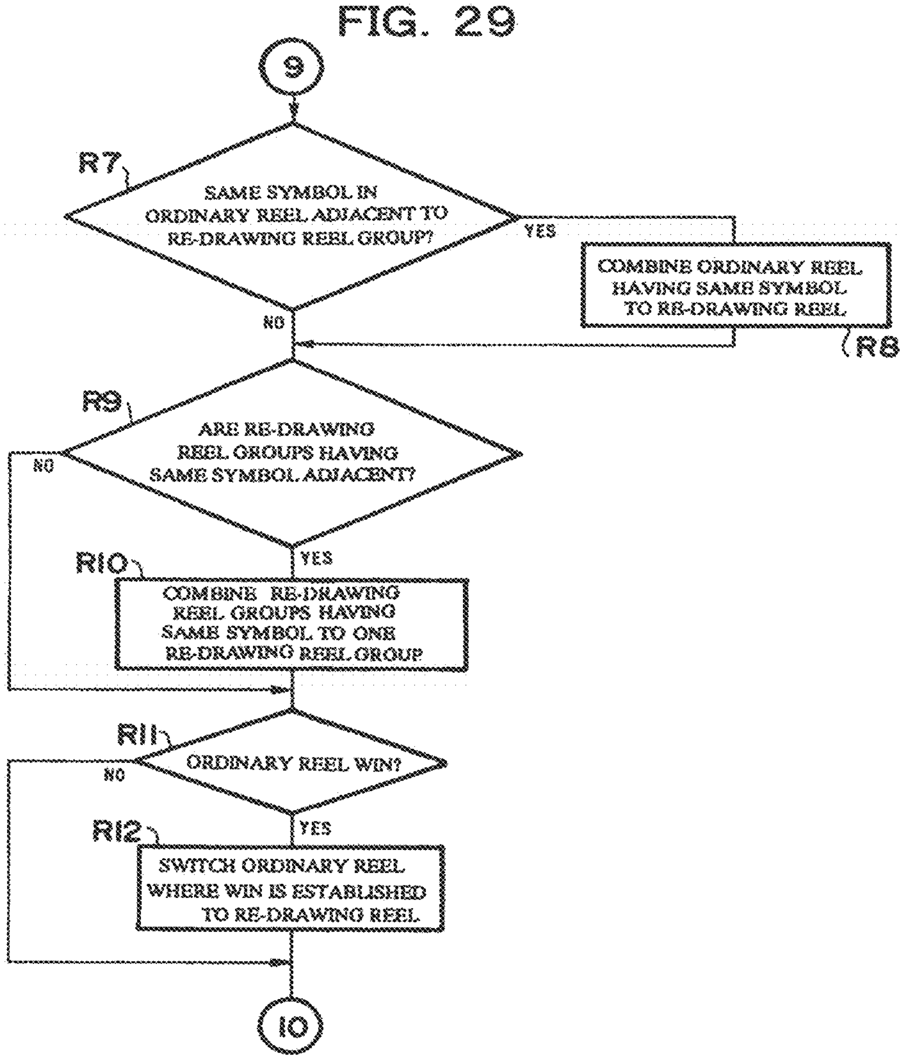
FIG. 29 is a flowchart showing performance of the gaming machine according to the fifth embodiment.

In the flowchart shown in FIG. 28, an ordinary game such as the first embodiment, is carried out (Step R1). Then, as shown in FIG. 7, in a case where a win situation is established by three or more trigger symbols "TRG" being adjacent, a dividend is provided to the player, and feature games (free games) as bonus games, are started. In the fifth embodiment, the number of feature games is five (Step R2).

When a first free game (bonus game) is started (Step R3), reels A5, A7, and A9 that have displayed trigger symbols, are switched to re-drawing reels (Step S7). The reels A5, A7, and A9 that become re-drawing reels are called a "first re-drawing reel group" as one group. Symbol alignment is the same, and synchronously rotates and stops at the same position on the reel in each reel A5, A7, and A9, which structure the re-drawing reel group.

For example, as shown in FIG. 8, the first re-drawing reel group (A5, A7, and A9) synchronously rotates, and the other reels independently rotate randomly. When the rotation of every ordinary reel and the first re-drawing reel group stops, it is determined whether a win situation is established or not (Step R4). In a case where a win situation is not established, the flow forwards to Step R13, and as shown in FIG. 9, in a case where a win situation is established, every dividend is paid (Step R5). The dividend at this time is set in accordance with the BET state. In FIG. 9, a win situation is established by the "BAR" symbols matching in adjacent reels A1, A2, and A4. Also, a win situation is established by "7" symbols matching in adjacent reels A6, A5, A7, and A9.

Then, it is determined whether there are any feature games (bonus games) left (Step R6). In a case where there aren't any feature games left, the flow forwards to Step R14, and in a case where there are feature games left, it is determined whether a win situation is established in the ordinary reels that are adjacent to the re-drawing reel group (Step R7). In a case where there isn't this kind of symbol, the flow forwards to Step R9, and in a case where there is this kind of symbol, the ordinary reel that has displayed the same symbol is combined to one re-drawing reel group (Step R8). Namely, as shown in FIG. 9, the reel A6 is adjacent to the first re-drawing reel group A5, A7, and A9, and has displayed a same symbol "7", the reel A6 is switched to a re-drawing reel, and structures the first re-drawing reel. Therefore, reels A5, A6, A7, and A9 have the same symbol alignment, and synchronously rotates and stops at the same position.

Then, it is determined whether same symbols are displayed in adjacent re-drawing reel groups, in a case where a plurality of re-drawing reel groups exist (Step R9). In a case where same symbols are not displayed in adjacent re-drawing reel groups, the flow forwards to step R11, and in a case where same symbols are displayed in adjacent re-drawing reel groups, the re-drawing reel groups that have displayed the same symbol, are combined (Step R10). Next, it is determined whether a win situation is established in the ordinary reels (Step R11). In a case where a win situation is not established in the ordinary reels, the flow forwards to Step R3, and in a case where a win situation is established in the ordinary reels, the ordinary reels that have established a win, is switched to a re-drawing reel (Step R12). For example, in a case shown in FIG. 9, a win situation is established by the "BAR" symbols matching in adjacent reels A1, A2, and A4. Therefore, these ordinary reels are switched to re-drawing reels, and become a second re-drawing reel group.

Next, the flow returns to Step R3, and a second feature game (bonus game) is carried out. Here, as shown in FIG. 10, the first re-drawing reel group (A5, A6, A7, and A9) that has the number of reels increased, the second re-drawing reel group (A1, A2, and A4), and the other ordinary reels (A3, and A8) respectively rotate independently. When every ordinary reel and re-drawing reel stops, it is determined whether a win situation is established or not (Step R4). For example, as shown in FIG. 11, in a case where a win situation is established in the first re-drawing reel group (A5, A6, A7, and A9), by a "BAR" symbol matching, and a win situation is established in the second re-drawing reel group (A1, A2, and A4), by the "BAR" symbol matching, dividend is paid (Step R5), and it is determined whether there are any feature games (bonus games) left (Step R6). In a case where a feature game is left, it is determined whether same symbols have appeared in ordinary reels adjacent to the re-drawing reel groups (here, it is the first and second re-drawing reel group) (Step R7). In a case where the same symbols have not appeared in the ordinary reels adjacent to the re-drawing reels, the flow forwards to Step R9, and in a case where the same symbols appear in the ordinary reels adjacent to the re-drawing reels, the ordinary reel that has the same symbol, is combined to the adjacent re-drawing reel group (Step R8).

In a case where a plurality of re-drawing reel groups exist, it is determined whether same symbols appear in adjacent re-drawing reel groups (Step R9). In a case where same symbols do not appear in adjacent re-drawing reel groups, the flow forwards to Step R10, and in a case where same symbols appear in adjacent re-drawing reel groups, the re-drawing reel group that has appeared the same symbol, is combined to one re-drawing reel group (Step R10). For example, as shown in FIG. 11, the same "BAR" symbol is displayed in the first re-drawing reel group (A5, A6, A7, and A9), and the second re-drawing reel group (A1, A2, A4). Therefore, the first and second re-drawing reels are combined to form a new reel group (a new re-drawing reel group). Namely, as shown in FIG. 11, reels (A1, A2, A4, A5, A6, A7, and A9) structure a new re-drawing reel group.

Next, it is determined whether a win situation is established in the ordinary reels (Step R11), and in a case where a win situation is not established, the flow forwards to Step R3, and in a case where a win situation is established, the reels according to that win are switched to re-drawing reels (Step R12). The case shown in FIG. 11, is a case where a win situation is not established in the ordinary reels.

In the next game, as shown in FIG. 12, a new re-drawing reel group (A1, A2, A4, A5, 5 A6, A7, and A9) and the ordinary reels (A3 and A8) respectively rotate independently.

As the above, third to fifth feature games are further carried out. Namely, in Step R4, in a case where a win situation is not established, it is determined whether a feature game (bonus game) is left (Step R13), and in a case where there is a feature game (bonus game) left, the flow forwards to Step R3. On the other hand, in Step R13, in a case where there isn't a feature game (bonus game) left, the flow forwards to Step R14. In Step R6, in a case where there isn't a feature game (bonus game) left, the feature game (bonus game) ends (Step R14), and moves to a game waiting state (Step R15). At the BET time of the next game, the re-drawing reel is returned to an ordinary reel (Step R15). From the next game, an ordinary game is carried out once again.

As described in the first to fifth embodiment, by the condition of re-drawing reels appearing, the condition of reels that structure the re-drawing reels increasing, and the number of the re-drawing reels themselves increasing, the game variation increases. By applying a plurality of trigger symbols, a more diverse game can be carried out.

(Sixth Embodiment)

A gaming machine according to a sixth embodiment, differs from the above first to fifth embodiments, in that the gaming machine comprises a reel that displays three-position reels, i.e., a reel that can display symbols in three columns, up, medium, and bottom, in one reel. This gaming machine determines whether it is a win situation or not, by a win line. The reel that the gaming machine comprises may be a rotating drum type, or a video type.

Figure 32:
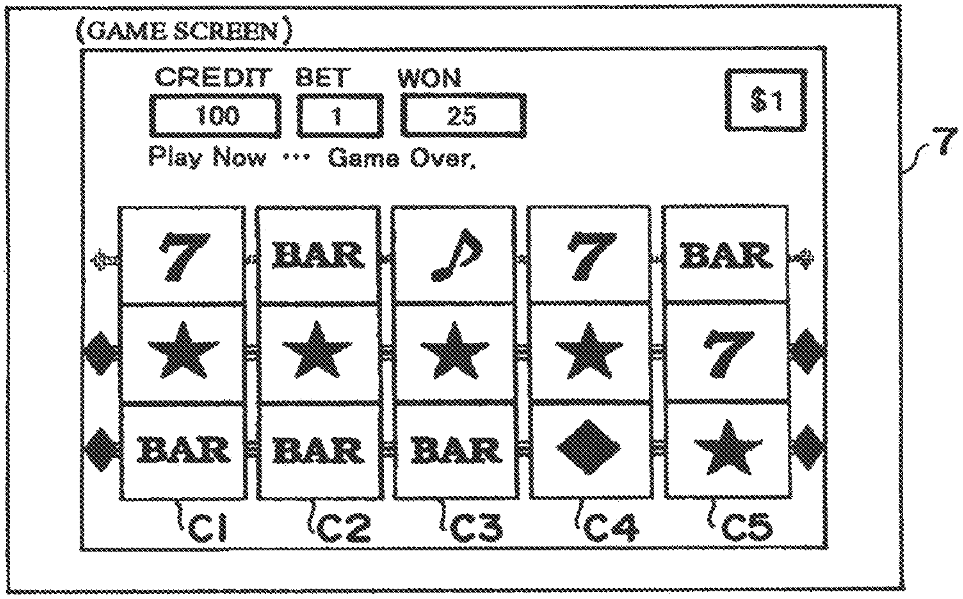
FIG. 32 is a diagram showing a screen display example of the gaming machine according to the sixth embodiment.

In a waiting state of an ordinary game, a screen such as shown in FIG. 32, is displayed in a symbol display unit 7. Namely, five independent reels C 1 to C5 that have different symbol alignment are displayed in a center part of the screen. These reels C1 to C5 structure a display region. There are symbol stop positions in up, middle, down column of the three columns, in each of the reels C1 to C5. A win line is set in each column. Betting on a pre-set win line is carried out, and a win situation in a game in the sixth embodiment is established in a case where a combination of equal to or more than a predetermined number of symbols match. For example, it can be set so that a win situation is established when three or more symbols appear on the win line.

In the case shown in FIG. 32, a win is situation is established by four "El" symbols matching in the win line of the middle column. Also, a win situation is established by three "BAR" symbols matching.

Ways for the symbols to match, for a win situation to be established may be for example, "the symbols may be in any place, as long as it is on the win line", "the symbols are adjacent on the win line", "the symbols are adjacent in an order from left end to the right direction", "the symbols are adjacent in an order from the right end to the left direction", and "the symbols are adjacent in an order from left end to right direction and right end to left direction", etc.

In the reels C1 to C5, a "scatter symbol" which is effective just by appearing in any reel, not concerning the win line. In the symbol display unit 7, a credit meter which displays number of credits, a BET meter which displays number of BETs, and a WON meter which shows the number of medals to be paid to the player when a win situation is established, are displayed.

In the sixth embodiment, in a case where three or more "trigger symbols", which are scatter symbols, appear in any of three or more reels, feature games (bonus games) are carried out five games after that game. In these feature games, reels where the trigger symbols appeared in the ordinary game, are switched to re-drawing reels. The reel that has displayed a trigger symbol during a feature game, is switched to a re-drawing reel from the next game. Namely, the number of re-drawing reels that structure one re-drawing reel group increases. The hardware structure of the gaming machine according to the sixth embodiment, can be structured in the same way as the first embodiment.

In the flowchart shown in FIG. 3, when a player inserts credits or money (these can be medals, coins, or cards), and carries out BET operation (STEP S1), a game is started (Step S2). At the same time as start of the game, as shown in FIG. 6, each reel A1 to A9 rotates in a direction from B to A in FIG. 6, and change displays symbols. Here, symbol alignment and rotating timing of each reel A1 to A9 each differ. Therefore, while the reels are rotating, it is unlikely that one reel becomes the same situation as another reel. Each reel A1 to A9 stops at predetermined timing, after a predetermined time has passed after starting rotation.

In the flowchart shown in FIG. 3, it is determined whether a win situation is established or not (Step S3). In a case where a win situation is not established, the game ends (Step S20), and in a case where a win situation is established, every dividend corresponding to that win is paid (Step S4). The dividend at this time, is determined in accordance with the BET situation. Then, it is determined whether the win is a win situation established by the trigger symbol (Step S5).

In a case where the win situation is not established by the trigger symbol, the game ends (Step S20).

Performance of the gaming machine according to a sixth embodiment structured as above, will be described with reference to flowcharts in FIGS. 30 and 31.

Figure 30:
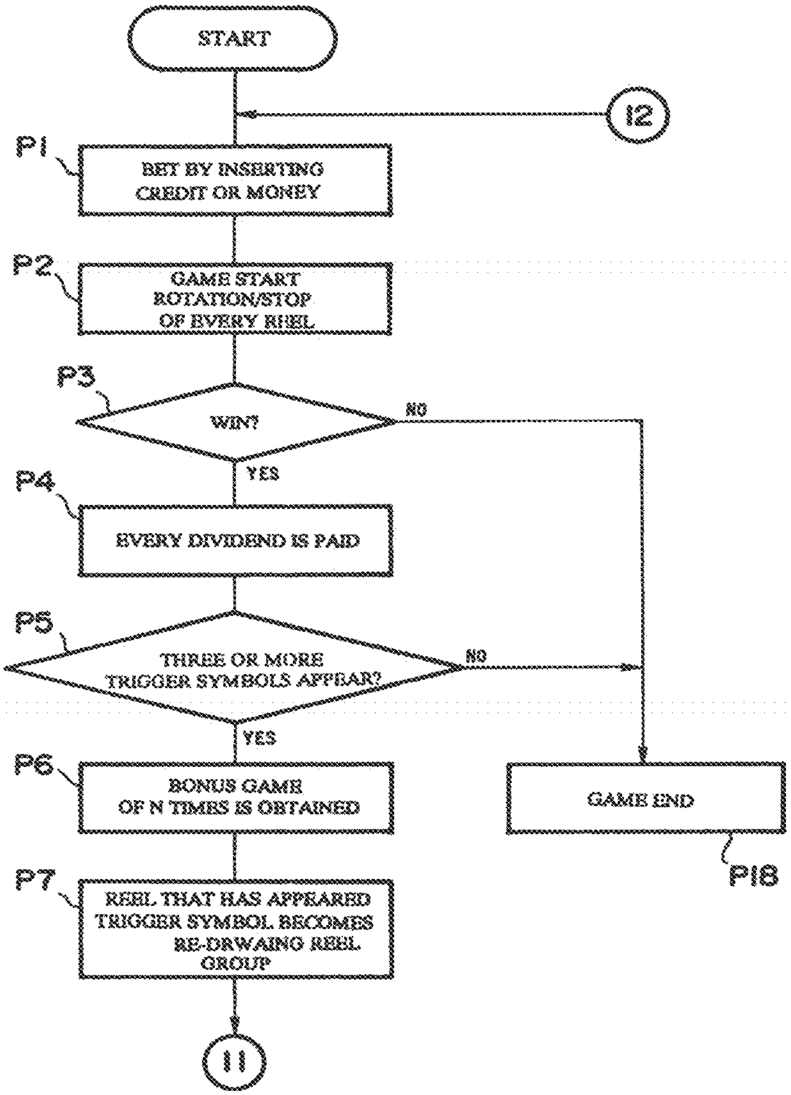
FIG. 30 is a flowchart showing performance of a gaming machine according to a sixth embodiment.
Figure 31:
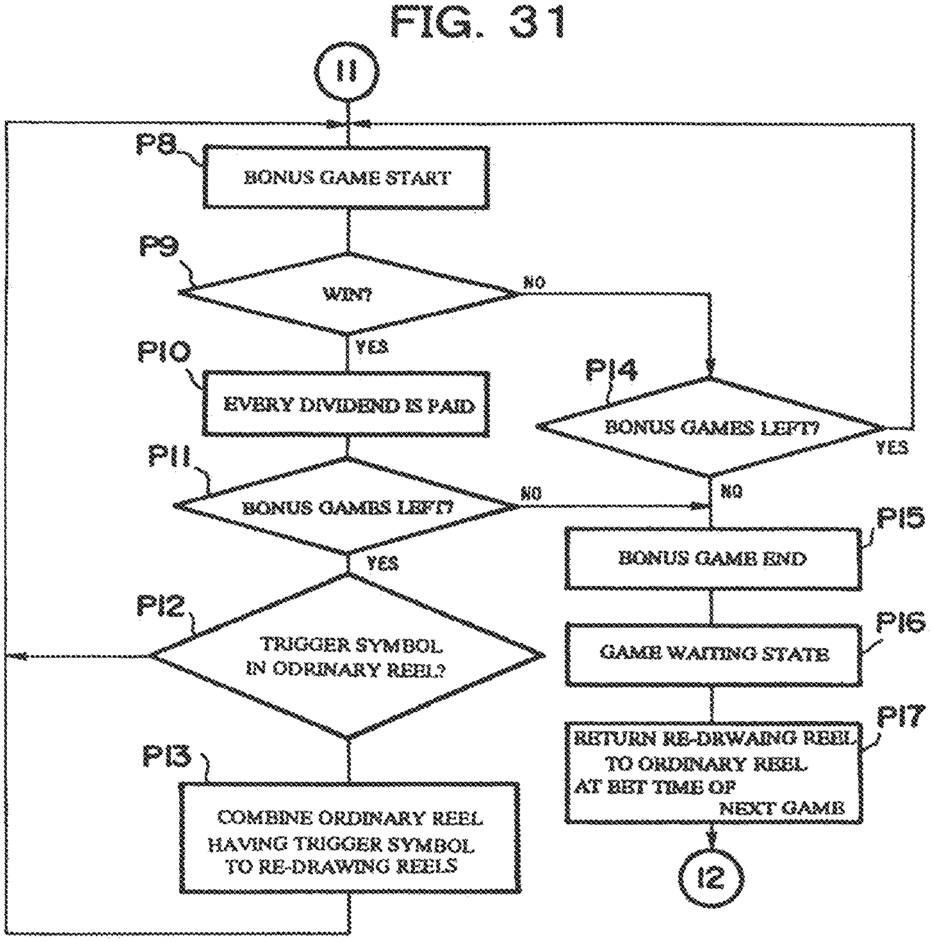
FIG. 31 is a flowchart showing performance of the gaming machine according to the sixth embodiment.

In the flowchart shown in FIG. 30, when a player inserts credits or money (these can be medals, coins, or cards), and carries out BET operation (STEP P1), a game is started (Step P2). At the same time as start of the game, each reel C 1 to C5 rotates, and change displays symbols. Here, symbol alignment and rotating timing of each reel C 1 to C5 each differ. Therefore, while the reels are rotating, it is unlikely that one reel becomes the same situation as another reel. Each reel C1 to C5 stops at a predetermined timing, after a predetermined time has passed after starting rotation. Then, it is determined whether a win situation is established or not (Step P3). In a case where a win situation is not established, the game ends (Step P18), and in a case where a win situation is established, every dividend corresponding to that win is paid (Step P4). The dividend at this time, is determined in accordance with the BET situation. Then, it is determined whether the win is a win situation established by three or more trigger symbols appearing (Step P5). In a case where the win situation is not established by the three or more trigger symbols appearing, the game ends (Step P18).

Figure 33:
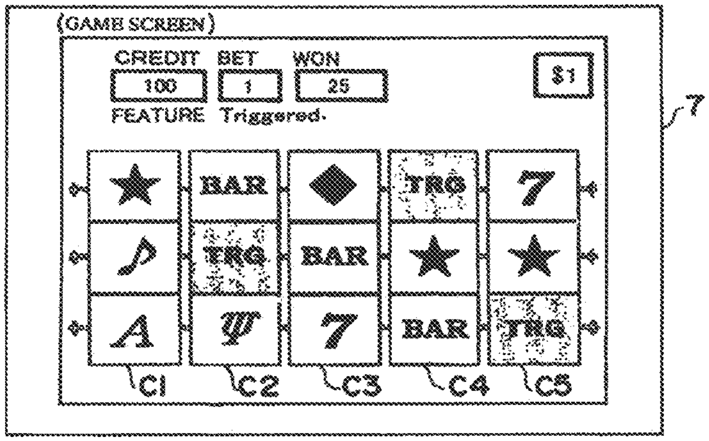
FIG. 33 is a diagram showing a screen display example of the gaming machine according to the sixth embodiment.

On the other hand, as shown in FIG. 33, in a case where a win situation is established by a total of three trigger symbols appearing in reels A5, A7, and A9, a feature game as a bonus game is started. Namely, the feature game is carried out in a case where three ore more trigger symbols appear in three or more of any reels. The number of times of the feature game is n (n is a natural number) times from the next game. In the sixth embodiment, the number of times of the feature game is five times (Step P6).

Figure 34:
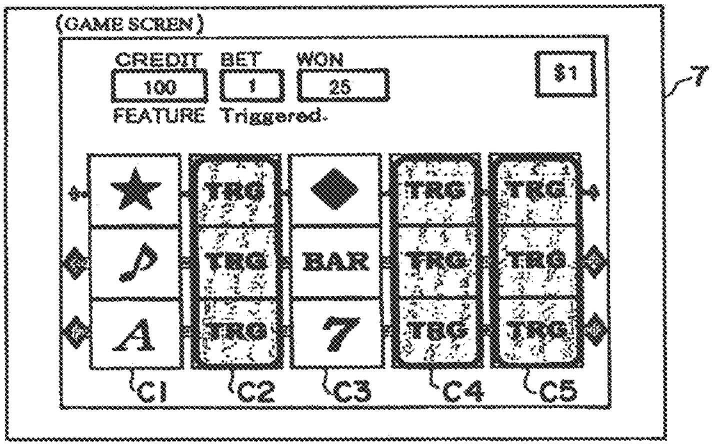
FIG. 34 is a diagram showing a screen display example of the gaming machine according to the sixth embodiment.

Reels C2, C4, and C5 that have displayed trigger symbols when a first free game is started, are switched to re-drawing reels. The reels C2, C4, and C5 that become re-drawing reels are called a "re-drawing reel group" as one group. As shown in FIG. 34, in the re-drawing reels, three same symbols are placed sequentially, and is set so that only the same symbols always stop on the reel. The re-drawing reels maintain a situation where the same symbols appear in every position, and carries out re-drawing of the symbols. Symbol alignment of the re-drawing reels and the ordinary reels are completely different. Here, because a win situation is not necessarily established in a maintained state, it does not necessarily mean that a win situation is maintained. Reels, wherein trigger symbols appeared, during the feature game period, are switched to re-drawing reels.

Figure 35:
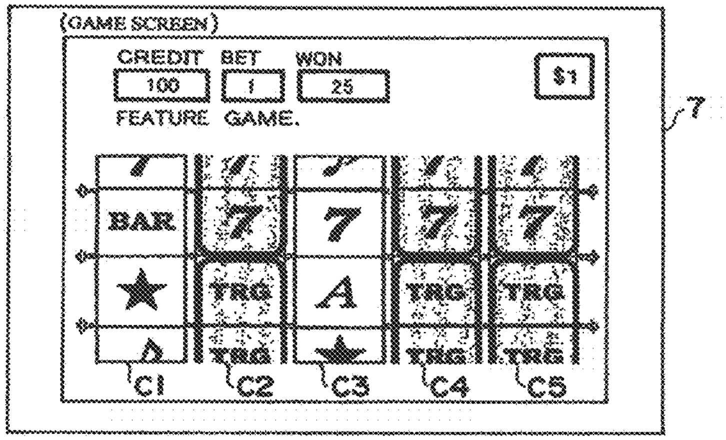
FIG. 35 is a diagram showing a screen display example of the gaming machine according to the sixth embodiment.

When a feature game (bonus game) is started (Step P8), as shown in FIG. 35, the re-drawing reel group (C2, C4, and C5) synchronously rotates the three sequential symbols, and the other reels (C1 and C3) independently rotate randomly. When the rotation of every ordinary reel and the re-drawing reel group stops, it is determined whether a win situation is established or not (Step P9). In a case where a win situation is not established, the flow forwards to Step P14. In a case where a win situation is established, every dividend is paid (Step P10). The dividend at this time is set in accordance with the BET state. For example, as shown in FIG. 36, when five "0" symbols match on the middle win line, a win situation corresponding to that symbol, and the number thereof is established.

Then, it is determined whether there are any feature games (bonus games) left (Step P11). In a case where there aren't any feature games left, the flow forwards to Step P15, and in a case where there are feature games left, it is determined whether a trigger symbol appeared in the ordinary reels or not (Step P12). In a case where a trigger symbol does not appear in the ordinary reels, the flow forwards to Step P8, and in a case where a trigger symbol appears in the ordinary reels, the ordinary reel that has appeared a trigger symbol is switched to a re-drawing reel, and combined (Step P13).

Figure 36:
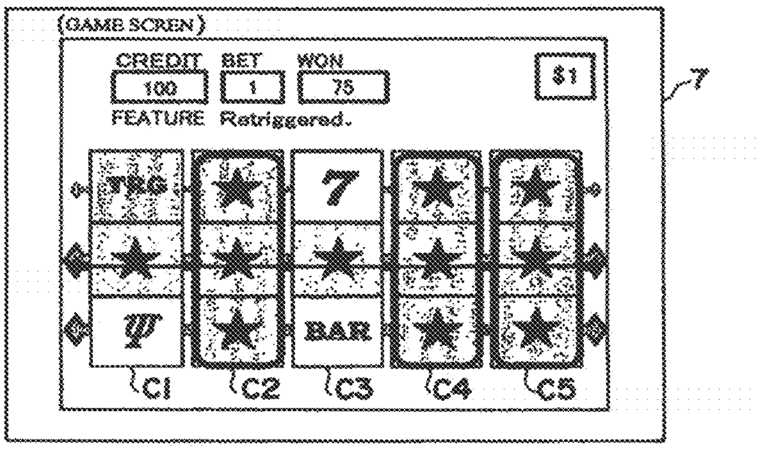
FIG. 36 is a diagram showing a screen display example of the gaming machine according to the sixth embodiment.

For example, in the case shown in FIG. 36, a trigger symbol appears in an ordinary reel C1, at the same time a win situation is established by five "0" symbols matching. Therefore, the reel C1 is switched to a re-drawing reel. Then, in the next feature game, the reel C 1 has the same symbol alignment as the other re-drawing reels, and synchronously rotates, and stops at the same position on the reel. Namely, in the feature game, re-drawing reels structured by redrawing reels (C1, C2, C4, and C5), and an ordinary reel C4, co-exist.

Figure 37:
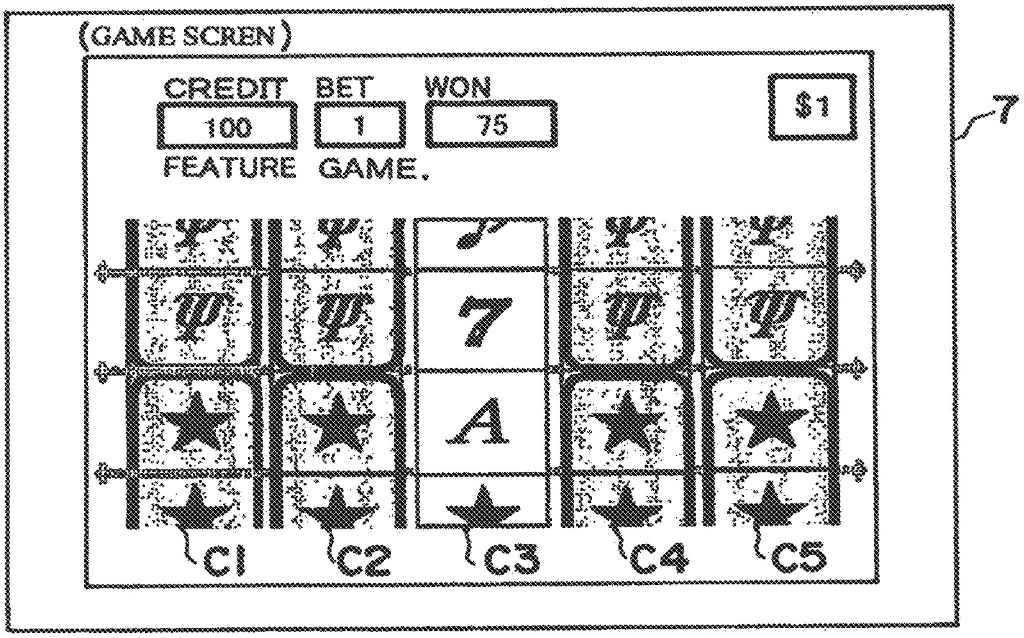
FIG. 37 is a diagram showing a screen display example of the gaming machine according to the sixth embodiment.

Next, the flow returns to Step P8, and as the above, the second to fifth feature games are carried out. As shown in FIG. 37, the re-drawing reels (C1, C2, C4, and C5) and the ordinary reel C3 respectively rotate independently. When every rotation of the reels stop, it is determined whether a win situation is established (Step P9), and in a case where win situation is not established, it is determined whether any feature games (bonus games) are left (Step P 14), and in a case where feature games (bonus games) are left, the flow forwards to Step P8. On the other hand, in Step P14, in a case where there aren't any feature games (bonus games), the flow forwards to Step P15. In Step P11, in a case where there aren't any feature games (bonus games) left, the feature game (bonus game) ends (Step P15), and moves to a game waiting state (Step P16). At the BET time of the next game, the re-drawing reel is retuned to an ordinary reel (Step P 17). From the next game, an ordinary game is carried out once again.

(Seventh Embodiment)

The seventh embodiment is also a gaming machine that comprises five reels, in the same way as the sixth embodiment. However, symbol alignment in the re-drawing reels and the ordinary reels are completely the same. Namely, the re-drawing reels in the seventh embodiment, do not have placed three same symbols sequentially, but have the same symbol alignment as the ordinary reels. In the seventh embodiment, when a trigger symbol appears in an ordinary reel during a feature game, the ordinary reel is switched to a re-drawing reel. Namely, the number of re-drawing reels that structure one re-drawing reel group increases. Other structure in the seventh embodiment, is the same as the sixth embodiment.

Figure 38:
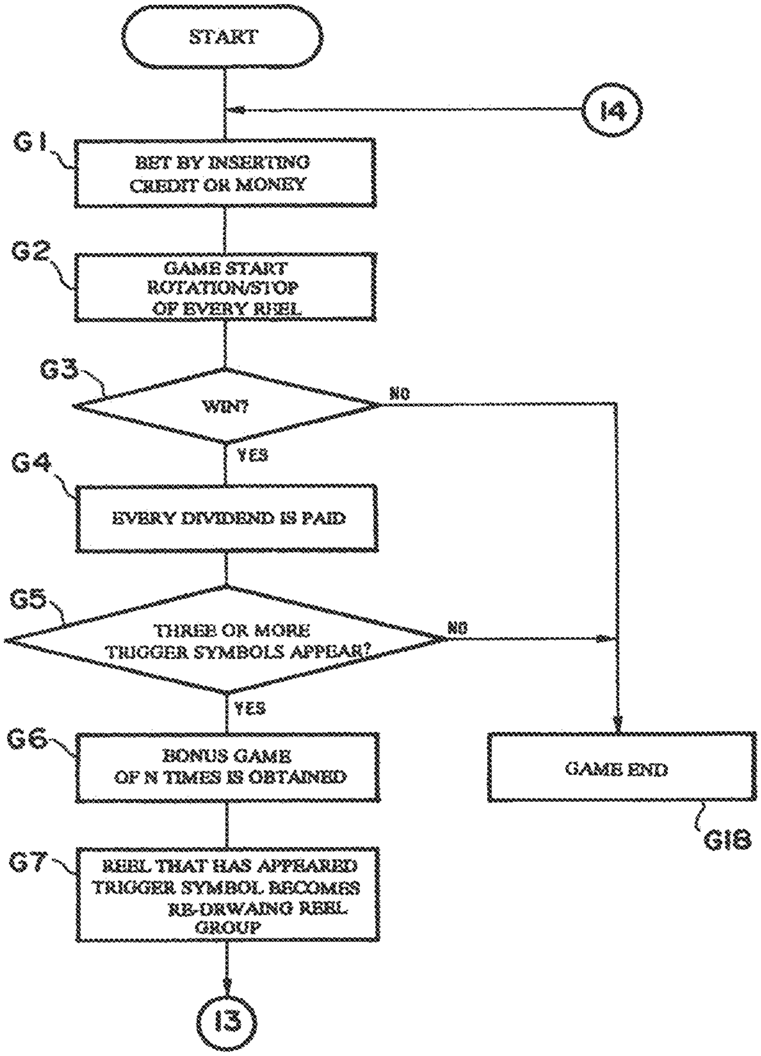
FIG. 38 is a flowchart showing performance of a gaming machine according to a seventh embodiment.
Figure 39:
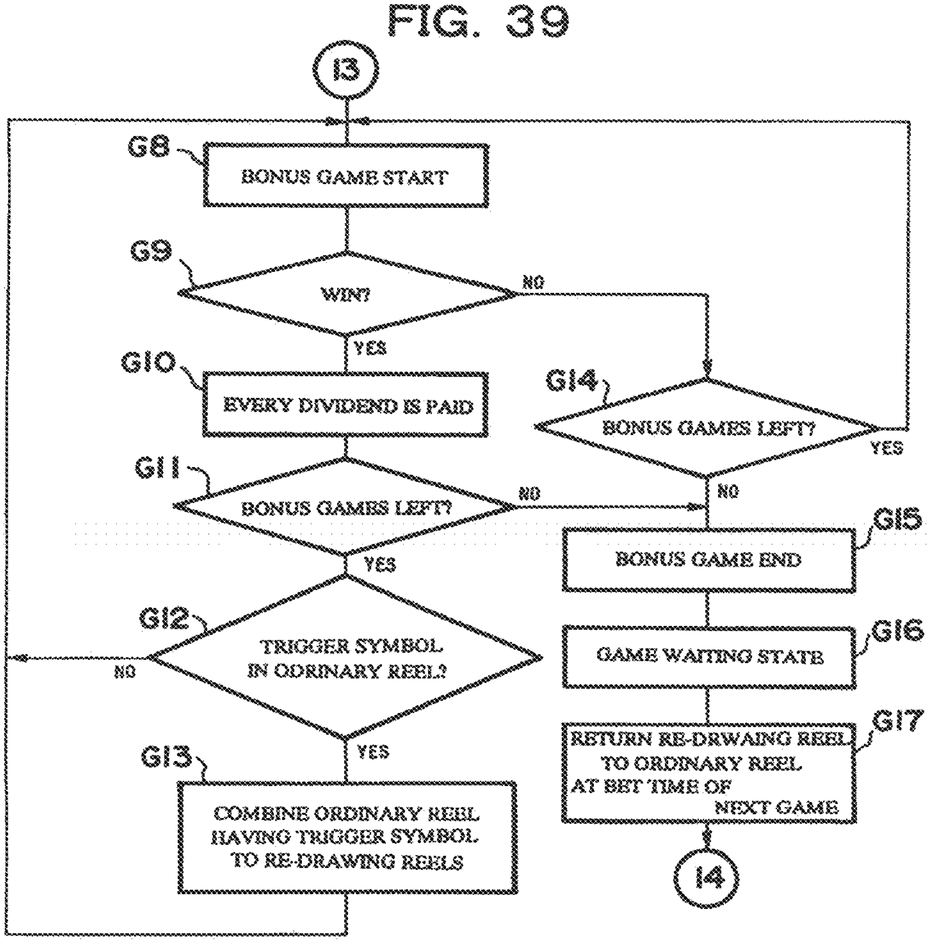
FIG. 39 is a flowchart showing performance of the gaming machine according to the seventh embodiment.
Figure 40:
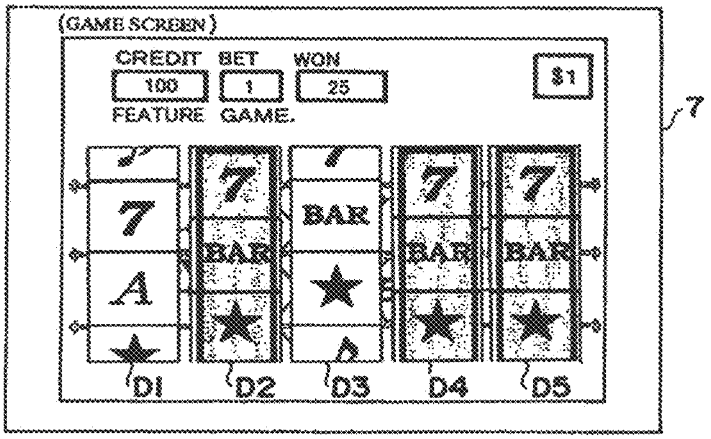
FIG. 40 is a diagram showing a screen display example of a gaming machine according to the seventh embodiment.

Performance of the gaming machine according to the seventh embodiment, will be described with reference to FIGS. 38 and 39. In the flowchart shown in FIG. 38, when a player inserts credits or money (these can be medals, coins, or cards), and carries out BET operation (STEP G1), a game is started (Step G2). At the same time as start of the game, as shown in FIG. 40, each reel D1 to D5 rotates, and change displays symbols. The reels D1 to D5 structure a display region. Here, symbol alignment and rotating timing of each reel D1 to D5 differ. Therefore, while the reels are rotating, it is unlikely that one reel becomes the same situation as another reel. Each reel D1 to D5 stops at a predetermined timing, after a predetermined time has passed after starting rotation. Then, it is determined whether a win situation is established or not (Step G3). In a case where a win situation is not established, the game ends (Step G18), and in a case where a win situation is established, every dividend corresponding to that win is paid (Step G4). The dividend at this time, is determined in accordance with the BET situation. Then, it is determined whether the win is a win situation established by three or more trigger symbols appearing (Step G5). In a case where the win situation is not established by three or more trigger symbols appearing, the game ends (Step G18).

On the other hand, in a case where a win situation is established by three or more trigger symbols appearing, a feature game as a bonus game is started. Namely, the feature game is carried out in a case where three ore more trigger symbols appear on whichever three or more reels. The number of times of the feature game is n (n is a natural number) times from the next game. In the seventh embodiment, the number of times of the feature game is five times (Step G6).

Figure 41:
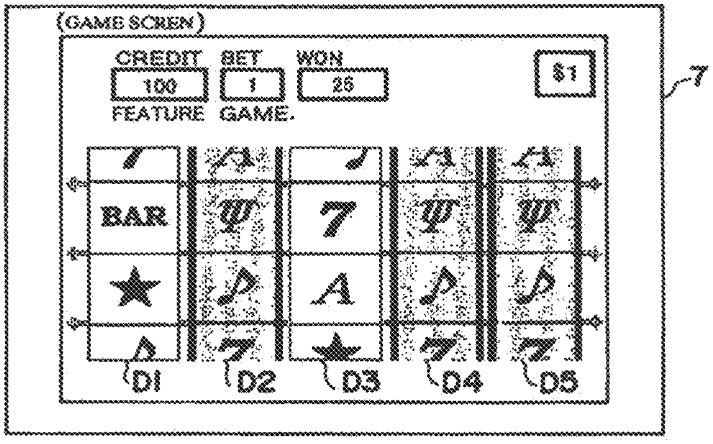
FIG. 41 is a diagram showing a screen display example of the gaming machine according to the seventh embodiment.

Reels that have displayed trigger symbols when a first free game (bonus game) is started (for example, reels D2, D4, and D5), are switched to re-drawing reels. The reels D2, D4, and D5 that become re-drawing reels are called a "re-drawing reel group" as one group. As shown in FIG. 41, the re-drawing reels are set so that only the same symbols always stop on the same win line. The re-drawing reels maintain a situation where the same symbols appear in every position, and carries out re-drawing of the symbols. Here, because a win situation is not necessarily established in a maintained state, it does not necessarily mean that a win situation is maintained. Reels, wherein trigger symbols appeared, during the feature game period, are switched to re-drawing reels.

When a feature game (bonus game) is started (Step G8), as shown in FIG. 41, the re-drawing reel group (D2, D4, and D5) synchronously rotates, and the other reels (ordinary reels: D1 and D3) independently rotate randomly. When the rotation of every ordinary reel and the first re-drawing reel group stops, it is determined whether a win situation is established or not (Step G9). In a case where a win situation is not established, the flow forwards to Step G14. In a case where a win situation is established, every dividend is paid (Step G10). The dividend at this time is set in accordance with the BET state. For example, as shown in FIG. 42, when five "BAR" symbols match in the bottom column, a win situation in accordance with that symbols and the number of symbols, is established.

Then, it is determined whether there are any feature games (bonus games) left (Step G11). In a case where there aren't any feature games (bonus games) left, the flow forwards to Step G15, and in a case where there are feature games (bonus games) left, it is determined whether triggers symbols have appeared in the ordinary reels (Step G 12). In a case where trigger symbols have not appeared in the ordinary reels, the flow forwards to Step G15, and in a case where trigger symbols have appeared in the ordinary reels, the ordinary reel that has appeared a trigger symbols is switched to a re-drawing reel, and combined (Step G13).

Figure 42:
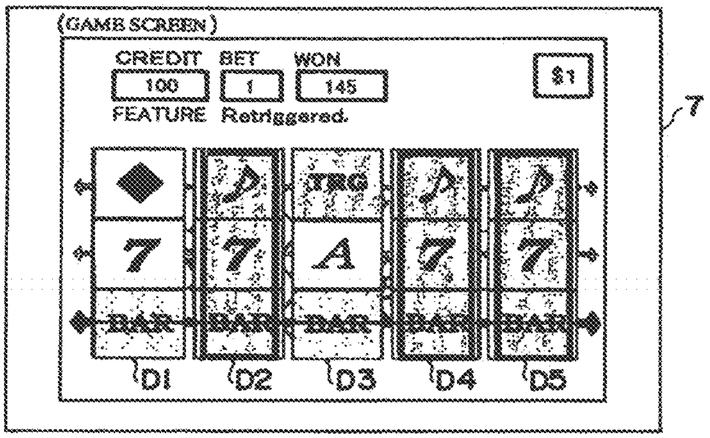
FIG. 42 is a diagram showing a screen display example of the gaming machine according to the seventh embodiment.
Figure 43:
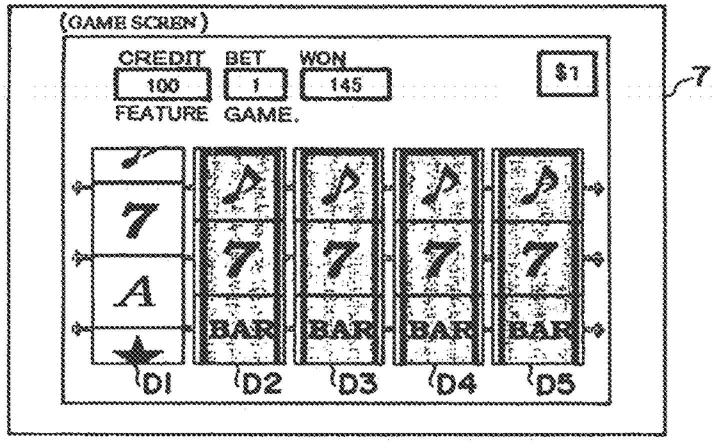
FIG. 43 is a diagram showing a screen display example of the gaming machine according to the seventh embodiment.

For example, in the case shown in FIG. 42, a win situation is established by five "BAR" symbols matching in the bottom column, and a trigger symbol appearing in an ordinary reel D3. Therefore, the reel D3 is switched to a re-drawing reel. Then, in the next feature game, the reel D3 has the same symbol alignment as the other re-drawing reels, and synchronously rotates, and stops at the same position on the reel. Namely, as shown in FIG. 43, in the next feature game, re-drawing reels structured by re-drawing reels (D2, D3, D4, and D5), and an ordinary reel D1, co-exist.

Figure 44:
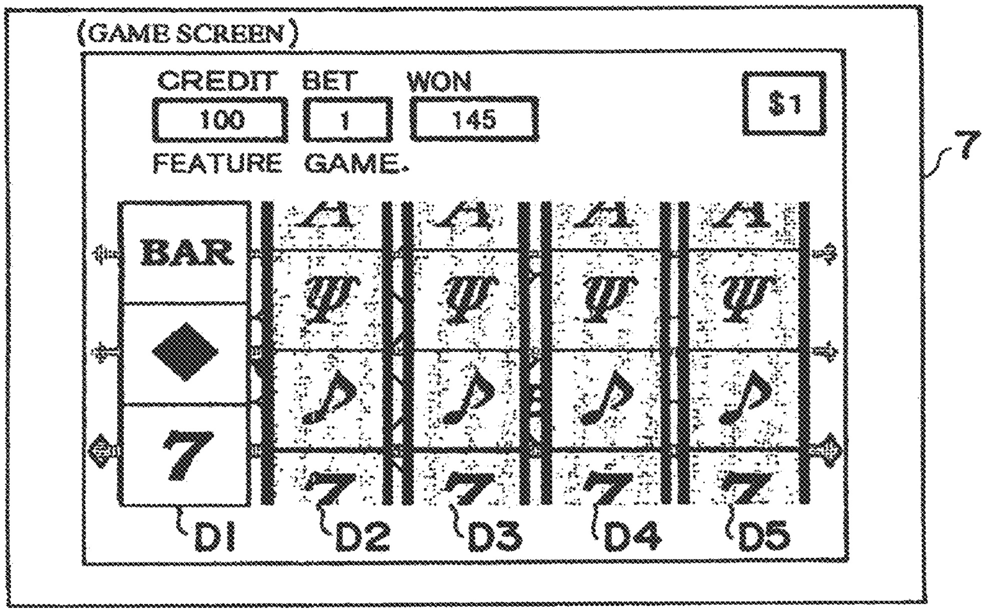
FIG. 44 is a diagram showing a screen display example of the gaming machine according to the seventh embodiment.

Next, the flow returns to Step G8, and as the above, the second to fifth feature games are carried out. As shown in FIG. 44, the re-drawing reels (D2, D3, D4, and D5) and the ordinary reel D1 respectively rotate independently. When every rotation of the reels stop, it is determined whether a win situation is established (Step G9), and in a case where win situation is not established, it is determined whether any feature games (bonus games) are left (Step G14), and in a case where feature games (bonus games) are left, the flow forwards to Step G8. On the other hand, in Step G14, in a case where there aren't any feature games (bonus games), the flow forwards to Step G15. In Step G11, in a case where there aren't any feature games (bonus games) left, the feature game (bonus game) ends (Step G15), and moves to a game waiting state (Step G16). At the BET time of the next game, the re-drawing reel is retuned to an ordinary reel (Step G17). From the next game, an ordinary game is carried out once again.

(Eighth Embodiment)

In the eighth embodiment, an embodiment where the number of re-drawing reel groups increase during a feature game, will be described. The structure of the gaming machine, is the same as the sixth embodiment.

Figure 45:
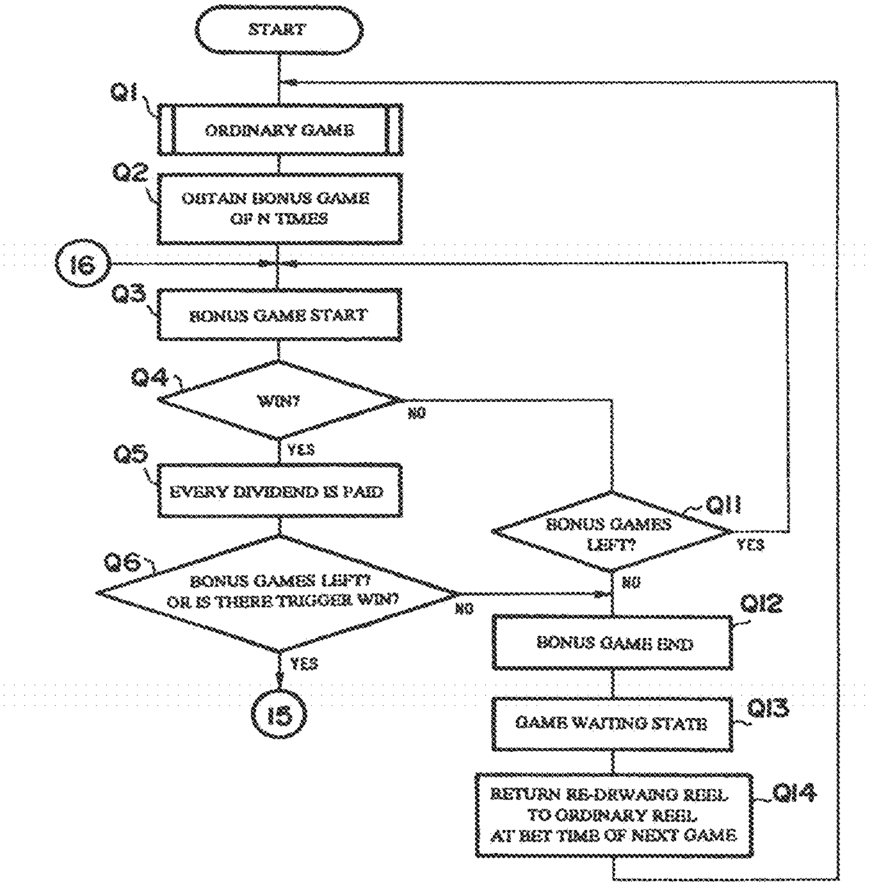
FIG. 45 is a flowchart showing performance of a gaming machine according to an eighth embodiment.
Figure 46:
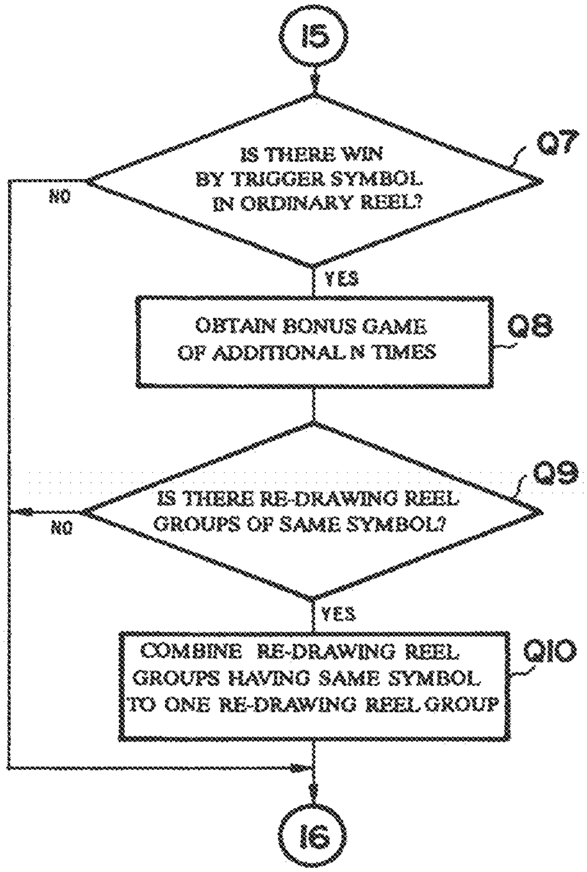
FIG. 46 is a flowchart showing performance of the gaming machine according to the eighth embodiment.

The performance of the gaming machine according to the eighth embodiment, will be described with reference to the flowcharts of FIGS. 45 and 46. In the flowchart shown in FIG. 45, in the same way as the sixth embodiment and the seventh embodiment, an ordinary game is carried out (Step Q1). Then, in a case where a win situation is established by a total of three trigger symbols appearing, feature games as bonus games start. The number of times of the feature game is n (n is a natural number) times from the next game. In the eighth embodiment, the number of times of the feature game is five times (Step Q2).

When a first free game (bonus game) starts, the reel that has displayed a trigger symbol, is switched to a re-drawing reel. The reels that become re-drawing reels, are called a "redrawing reel group" as one group. Three same symbols may be placed sequentially in the redrawing reels, in the same way as the sixth embodiment, and may have the same symbol alignment as the ordinary reels, in the same way as the seventh embodiment. The re-drawing reels are set so that only the same symbols always stop on the reel. The re-drawing reels maintain a situation where the same symbols appear in every position, and carries out re-drawing of the symbols. Here, because a win situation is not necessarily established in a maintained state, it does not necessarily mean that a win situation is maintained.

When a feature game (bonus game) is started (Step Q3), the re-drawing reels (C2, synchronously rotate three sequential symbols, and the other reels independently rotate randomly. When the rotation of every ordinary reel and the re-drawing reel group stops, it is determined whether a win situation is established or not (Step Q4). In a case where a win situation is not established, the flow forwards to Step Q11. In a case where a win situation is established, every dividend is paid (Step Q5). The dividend at this time is set in accordance with the BET state.

Then, it is determined whether there are any feature games (bonus games) left, or whether there is a win situation by the trigger symbol (Step Q6). In a case where there aren't any feature games left and there isn't a win situation by the trigger symbol, the flow forwards to Step Q12, and in a case where there are feature games left, or there is a win situation by the trigger symbol, it is determined whether a win situation is established by the trigger in an ordinary reel (Step Q7). In a case where a win situation by a trigger symbol is not established in an ordinary reel, the flow forwards to step Q3, and in a case where a win situation by a trigger symbol is established in an ordinary reel, the player obtains a feature game (bonus game) of an addition of n times (Step Q8). Then, in the next game, the ordinary reel that has established a win situation by the trigger symbol, is switched to an independent re-drawing reel, which differs from the already existing re-drawing reels.

Then, it is determined whether same symbols are displayed in re-drawing reel groups, in a case where a plurality of re-drawing reel groups exist (Step Q9). In a case where there aren't 5 any re-drawing reel groups, wherein the same symbols appear, the flow forwards to Step Q3. On the other, in a case where there are re-drawing reel groups, wherein the same symbols appear, the re-drawing reel groups having the same symbols are combined to one re-drawing reel group (Step Q10). Because it is the first feature game, combining in Step Q10 is not carried out.

Next, the flow returns to Step Q3, and a second feature game is carried out. The re-drawing reel groups and the ordinary reels respectively rotate independently. When every ordinary reel and re-drawing reel stops, it is determined whether a win situation is established or not (Step Q4). In a case where win situation is established, every dividend is paid (Step Q5), and is determined whether any feature games (bonus games) are left, or whether there is a win by a trigger symbol (Step Q6). In a case where there aren't any feature games (bonus games) left, and there isn't a win by the trigger symbol, the flow forwards to Step Q12. On the other hand, in a case where a feature game (bonus game) is left, or there is a win by the trigger symbol, it is determined whether there is a win by the trigger symbol in and ordinary reel (Step Q7). In a case where there isn't a win by the trigger symbol in the ordinary reel, the flow forwards to Step Q3, and in a case where there is a win by the trigger symbol in the ordinary reel, the player obtains feature games (bonus games) of an additional n times, and the ordinary reel according to the win by the trigger symbol, is switched in the next game, to an independent re-drawing reel, different from the already existing re-drawing reels.

In a case where a plurality of re-drawing reel groups exist, it is determined whether same symbols appear in the re-drawing reel groups (Step Q9). In a case where there are re-drawing reel groups wherein a same symbol appears, the re-drawing reel group that has appeared the same symbol, is combined to one re-drawing reel group (Step Q10).

The flow forwards to step Q3, and feature games from the third feature game and later, are carried out. Namely, after the feature game is started (Step Q3), it is determined whether a win situation is established or not (Step Q4). In a case where a win situation is not established, it is determined whether any feature games (bonus games) are left (Step Q11), and in a case where there is a feature game (bonus game) left, the flow forwards to Step Q3. On the other hand, in Step Q11, in a case where there isn't a feature game (bonus game) left, the flow forwards to. Step Q12. In step Q6, in a case where there isn't a feature game (bonus game) left, the feature game (bonus game) ends (Step Q12), and moves to a game waiting state (Step Q13). At the BET time of the next game, the re-drawing reel is retuned to an ordinary reel (Step Q14). From the next game, an ordinary game is carried out once again.

Other than the above described sixth to ninth embodiments, reels that simply have a few same symbols sequentially placed can be used as re-drawing reels, and can carry out re-drawing so that a situation where same symbols appear in the positions of the up, middle and down column.

(Ninth Embodiment)

In the ninth embodiment, in a case where a symbol that establishes a specific win is top displayed in whichever of a plurality of ordinary reels, the ordinary reel that has displayed the symbols that establish a specific win are switched to re-drawing reels, in a predetermined number of games from the next game. Drawing from a plurality of types of symbols is carried out, so that at least one win from a same win group as the win group that the specific win belongs to, is established in the re-drawing reel.

Figure 49:
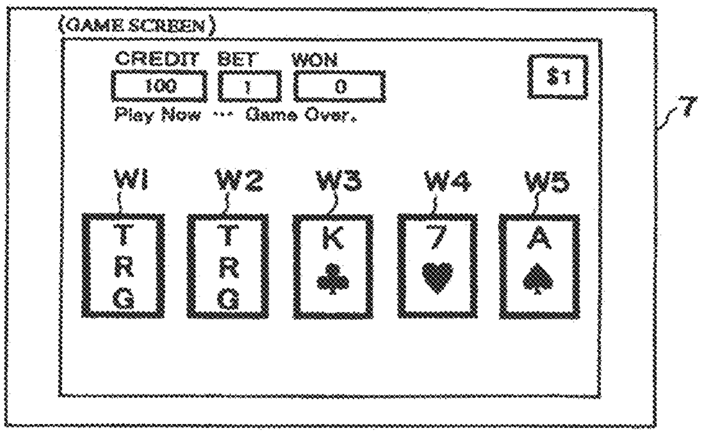
FIG. 49 is a diagram showing a screen display example of a gaming machine according to a ninth embodiment.

For example, a poker game is carried out. As shown in FIG. 49, either a symbol drawn on a card or a trigger symbol is displayed by five reels W1 to W5. The reels W1 to W5 structure a display region. Each reel W1 to W5 is displayed in a state where the cards are turned face down, so that the symbols can not be seen at a start of the game. After the game starts, symbols are displayed in each reel W1 to W5 in a way that the cards are sequentially turned over. When a win situation is established by a trigger symbol, feature games (bonus games) are carried out five games after that game. At the start of the feature game, the ordinary reels (W1 and W2) that had displayed trigger symbols, are switched to re-drawing reels.

Figure 52:
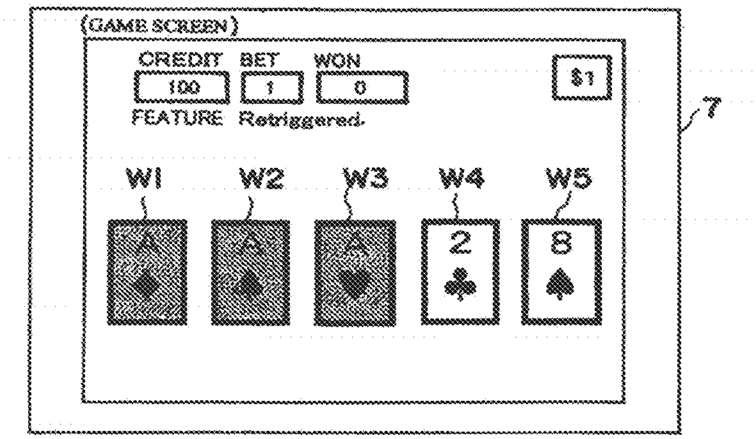
FIG. 52 is a diagram showing a screen display example of the gaming machine according to the ninth embodiment.

In the first feature game, symbols are drawn so that a win situation by two cards is established in the re-drawing reels (W1 and W2). In a poker game, it is "one pair". During the feature game period, as shown in FIG. 52, in a case where a win situation is established in the ordinary reel W2 by the combination of re-drawing reels (W1 and W2), the ordinary reel W3 is combined as a re-drawing reel. Namely, in the next feature game, symbols are drawn so that a win situation is established in three cards. In a poker game, it corresponds to "three of a kind".

FIG. 54 shows the kinds of well-known wins in for example, a poker game. First, "no pair" corresponds to a situation where none of the below wins exist. "One pair" is a situation where there are two cards (one pair) of a same number in the five cards. "Two pair" is a situation where there are two kinds of pairs in the five cards. "Three card" is a situation where there are three cards of a same number in the five cards. "Straight" is a situation where numbers are sequential in all five cards. "Flush" is a situation where all five cards are of a same suit (for example, spades, or diamonds). "Full house" is a situation where there is a "pair" and a "three card" in the five cards. "Four of a kind" is a situation where there are four cards of a same number in the five cards. "Straight flush" is a situation where the five cards are a "flush" and a "straight". These plurality of types of wins structure a "win group".

In a gaming machine according to a ninth embodiment, in a case where there are for example, two re-drawing reels, symbols that have the possibility of being "one pair" is drawn. In a case where there are four re-drawing reels, symbols that have the possibility of being "two pair" or "four of a kind" is drawn. In a case where there are five re-drawing reels, symbols that have the possibility of being "straight", "flush", "full house" or "straight flush" is drawn.

The hardware structure of the gaming machine according to the ninth embodiment, is the same as the first embodiment.

Figure 47:
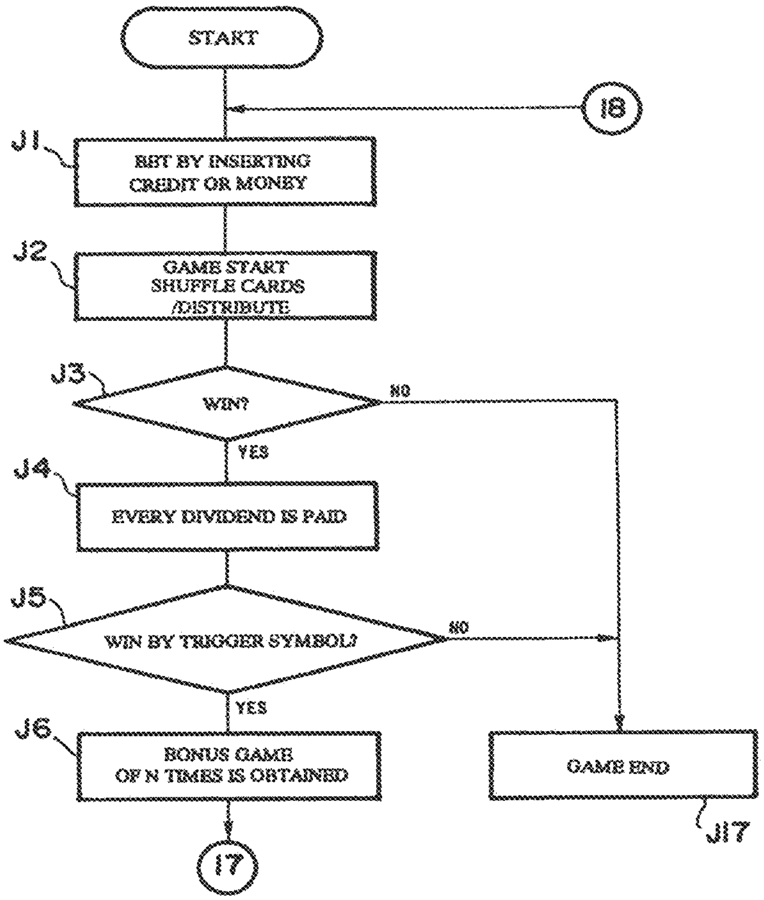
FIG. 47 is a flowchart showing performance of a gaming machine according to a ninth embodiment.
Figure 48:
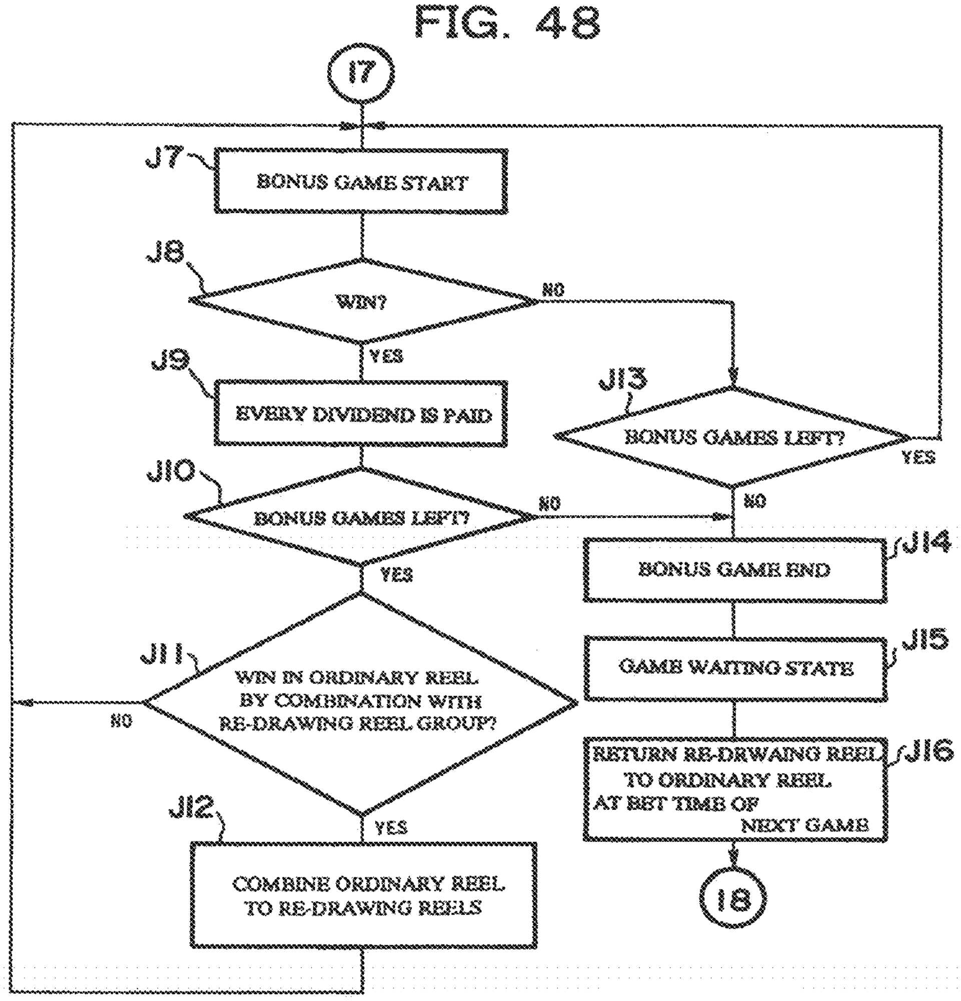
FIG. 48 is a flowchart showing performance of the gaming machine according to the ninth embodiment.

Performance of the gaming machine according to the ninth embodiment will be described. FIGS. 47 and 48 are flowcharts showing performance of the gaming machine according to the ninth embodiment, and FIGS. 49 to 53 are diagrams showing screen display examples of a symbol display unit 7. In a wait state of an ordinary game, a screen such as shown in FIG. 49 is displayed in the symbol display unit 7. Namely, reels W1 to W5 having a shape of a rectangle, which independently change or stop displays symbols, is displayed in a center part of a screen, as cards.

Other than the reels W1 to W5, a credit meter which displays number of credits, a BET meter which displays number of BETs, and a WON meter which indicates number of medals that are paid off to a player at a time of a win situation. In the ninth embodiment, as above, a win situation occurs when a win in a poker game is established.

In the flowchart shown in FIG. 47, when a player inserts credits or money (these can be medals, coins, or cards), and carries out BET operation (STEP J1), a game is started (Step J2). At the same time as start of the game, each reel W1 to W5 change displays symbols, as though shuffling is carried out. Here, symbol alignment and change display timing of each reel W1 to W5 differ. Therefore, while the reels are changing, it is unlikely that one reel becomes the same situation as another reel. Each reel A1 to A9 stops at a predetermined timing, after a predetermined time has passed after starting change display.

Then, it is determined whether a win situation is established or not (Step J3). In a case where a win situation is not established, the game ends (Step J17), and in a case where a win situation is established, every dividend corresponding to that win is paid (Step J4). The dividend at this time, is determined in accordance with the BET situation. Then, it is determined whether the win is a win situation established by the trigger symbol (Step J5). In a case where the win situation is not established by the trigger symbol, the game ends (Step J17).

On the other hand, as shown in FIG. 49, in a case where a win situation is established by two trigger symbols being displayed (one pair) in reels W1 and W2, a feature game as a bonus game is started. Namely, the—feature game is carried out in a case where a win situation is established by the trigger symbols. Here, the win situation by the trigger symbols, is established in a case where a plurality of trigger symbols appear. The number of times of the feature game is n (n is a natural number) times from the next game. In the ninth embodiment, the number of times of the feature game is five times (Step J6).

When a first feature game (bonus game) is started, reels W1 and W2 that have displayed trigger symbols, are switched to re-drawing reels (Step J7). The reels W1 and W2 that become re-drawing reels are called a "re-drawing reel group" as one group. Each reel W1 and W2 that structures the re-drawing reel group have the same symbol alignment, and synchronously rotates and stops at the same position on the reel, so as to stop display a symbol that establishes "one pair".

Figure 50:
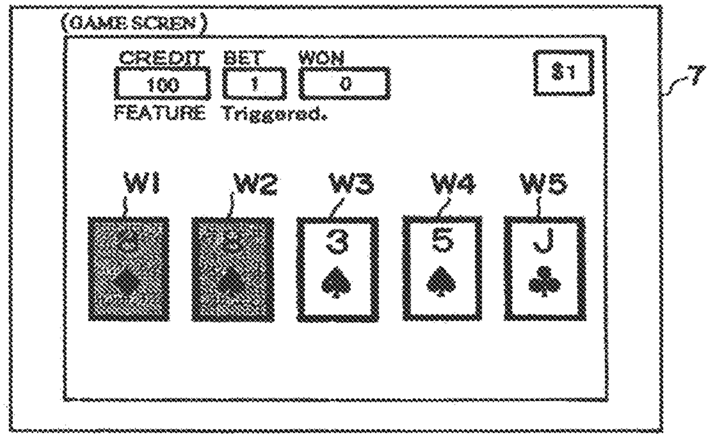
FIG. 50 is a diagram showing a screen display example of the gaming machine according to the ninth embodiment.
Figure 51:
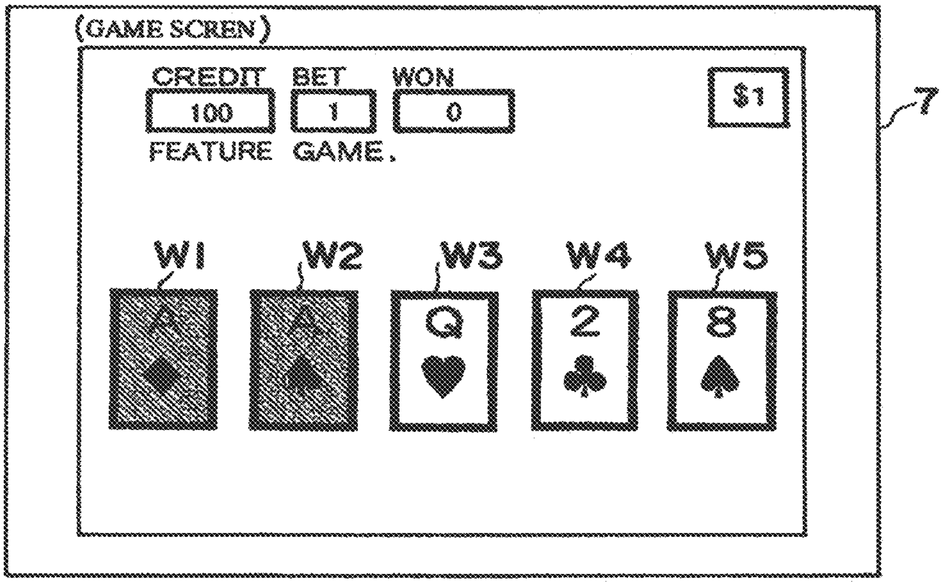
FIG. 51 is a diagram showing a screen display example of the gaming machine according to the ninth embodiment.

A feature game (bonus game) is started, and the re-drawing reels (W 1 and W2) synchronize and change display symbols, and the other reels respectively change display symbols randomly. When change display of every ordinary reel and re-drawing reel group stops, it is determined whether a win situation is established (Step J8). In a case where a win situation is not established, the flow forwards to Step J13, and as shown in FIG. 50, in a case where a win situation is established, every dividend is paid (Step J9). The dividend at this time is determined in accordance with the BET state. In FIG. 50, a win situation of "one pair" is established by "8" symbols matching in the re-drawing reels (W1 and W2). For example, in FIG. 51, a win situation of "one pair" is established by "A" symbols matching in the re-drawing reels (W1 and W2). Then, it is determined whether there are any feature games (bonus games) left (Step J10). In a case where there aren't any feature games left, the flow forwards to Step J14, and in a case where there are feature games left, it is determined whether a win situation is established in an ordinary reel by a combination with the re-drawing reels (Step J11). In Step J11, in a case where a win situation is not established in the ordinary reel with the combination of the re-drawing reels, the flow forwards to Step J7, and in a case where a win situation is established in the ordinary reel with the combination of the re-drawing reels, the reels according to that win is combined to the re-drawing reel group at the start of the next game (Step J12).

Next, the flow returns to Step J7, and a second feature game (bonus game) is carried out. The re-drawing reel group (W1 and W2) and the other ordinary reels (W3 to W5) respectively change display symbols independently. When every ordinary reel and re-drawing reel stops, it is determined whether a win situation is established or not (Step J8). For example, as shown in FIG. 52, in a case where a win situation of "three card" is established by an "A" symbol matching in the re-drawing reel group (W1 and W2) and the ordinary reel W3, dividend corresponding to that win is paid (Step J9), and it is determined whether there are any feature games (bonus games) left (Step J10). In a case where a feature game is left, it is determined whether a win situation is established in the ordinary reel, and when a win situation is not established, the flow forwards to Step J7, and when a win situation is established, the reel W3 according to the win situation, is combined to the re-drawing reel group from the next game (Step J12).

Figure 53:
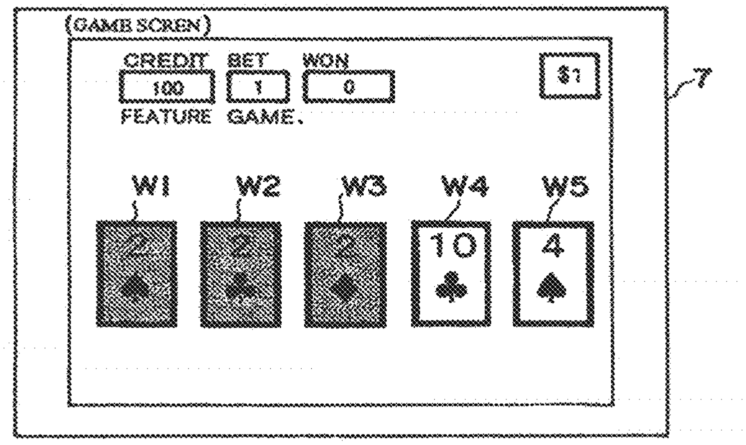
FIG. 53 is a diagram showing a screen display example of the gaming machine according to the ninth embodiment.

In the next game, the reel group (W1, W2, and W3) and the ordinary reels (W4 and W5) independently change displays and stop displays symbols. Then, in the re-drawing reel group (W1, W2, and W3), drawing is carried out from a combination of symbols that can establish for example, "three card", as shown in FIG. 53, and change display and stop display of symbols are carried out.

As the above, third to fifth feature games are carried out. Namely, in Step J8, in a case where a win situation is not established, it is determined whether there are any feature games (bonus games) left (Step J13), and in a case where feature games (bonus games) are left, the flow forwards to Step J7. On the other hand, in a case where there aren't any feature games (bonus games) left, the flow forwards to Step J14. In Step J10, in a case where there aren't any feature games (bonus games) left, the feature game (bonus game) ends (Step J14), and moves to a game waiting state (Step J15). At the BET time of the next game, the re-drawing reel is retuned to an ordinary reel (Step J16). From the next game, an ordinary game is carried out once again.

In this way, according to the ninth embodiment, in a case where symbols that establish a specific win are stop displayed in whichever of a plurality of ordinary reels, because drawing is carried out from a plurality of types of symbols so that any one win of a same win group as the win group that the specific win belongs to (group to which the win belongs to) is established, the win can be changed, maintaining the win situation. By this, players feel intrigued, and the player's interest towards the game can be raised. In the ordinary reels that have displayed symbols other than symbols that establish a specific win, because drawing is carried out from a plurality of types of symbols, so that arbitrary symbols are respectively displayed independently, ordinary reels and re-drawing reels independently exist and co-exist. Namely, re-drawing is not carried out using every reel, but re-drawing results are displayed in re-drawing reels, which are part of the display region, and ordinary drawing results are displayed in one part of the remaining display region. By this, because drawing results are displayed by two types of regions: the re-drawing reels and the ordinary reels, existing, a new kind of game that arouses the player's interests can be realized. Every display region can become a re-drawing reel, in accordance with the course of the game.

Besides the embodiments described above, as a result of drawing, in a case where a symbol that is to be displayed in whichever ordinary reel is the same as the symbol to be displayed in the re-drawing reel, in special games of a predetermined number of times after the next game, the ordinary reel and the re-drawing reel may be combined. Namely, in a case where a symbol that is the same as the re-drawing reel is displayed in an ordinary reel that is not necessarily adjacent, the ordinary reel and the re-drawing reel are combined.

By this, during the period of the feature game, every time a same symbol as the re-drawing reel is displayed—in an ordinary reel, the number of reels that structure the re-drawing reel group increases. Because drawing is carried out from a plurality of types of symbols so that the same symbol is stop displayed in every re-drawing reel, the same symbols are stop displayed in the re-drawing reel group. By this, diverse re-drawing can be carried out in the re-drawing reels. As a result, a strong impression can be provided to the players, and it is possible to arouse the player's interests.

Characteristic performance of the present invention such as above, can be carried out by controlling a computer to execute a control program. Namely, this control program is structured so that a series of processing including: a processing of displaying a plurality of types of symbols in a plurality of display regions (for example, A1 to A9 shown in FIG. 5), upon starting a game; and in a case of stop displaying a predetermined symbol (for example TRG shown in FIG. 7), in the plurality of display regions, a processing of setting the display regions that stop display the predetermined symbol as specific display regions (for example, A5, A7, and A9), and in a predetermined times of games after the first game, draws for the specific display regions, symbols from the plurality of types of symbols that are to be displayed, so that there is a specific relationship among the symbols in each game, and at the same time setting the display regions other than the specific display region as a general display region, and draws for the general display region, a symbol from the plurality of types of symbols that are to be displayed, so that there isn't a predetermined relationship among the symbols, as an instruction group that can be executed by the computer.

In this way, in a case where a predetermined symbol is stop displayed in a plurality of display regions, the display regions that stop display the predetermined symbols are set as specific display regions, and because drawing in a predetermined times of games after the first game is carried out from a plurality of types of symbols that are to be displayed, so that there is a specific relationship among the symbols in each game, symbols having a predetermined relationship are displayed in the specific display region. By this, an independent drawing result (re-drawing result) which differs from the general display region can be displayed in the specific display region. The display regions other than the specific display regions are set as general display regions. In the general display regions, because drawing is carried out from a plurality of types of symbols that are to be displayed without the symbols having a predetermined relationship, the general display regions and specific display regions are respectively independent and coexist. Namely, re-drawing is not carried out using every region, but re-drawing result is displayed in the specific display regions, which are a part of the display regions, and in the region of a remaining part, ordinary drawing result is displayed. By this, because drawing results are displayed by two types of regions: the specific display regions and the ordinary display regions, existing, a new kind of game that arouses the player's interests can be realized. Every display region can become a specific display region, in accordance with the course of the game.

Another control program is structured so that a series of processing including: processing of displaying changing display which displays, constantly changing a plurality of symbols in a stopped state to a plurality of types of symbols on a plurality of display regions (for example, A1 to A9 shown in FIG. 5), upon starting of a game, and stop display which once again stops the symbols that are changing at each display region, setting the display regions where the predetermined symbols are to be displayed stopped, as a specific display region, and in a predetermined times of games after the first game, draws for the specific display region (for example, A5, A7, and A9 shown in FIG. 7), symbols from the plurality of types of symbols that are to be displayed, so that there is a specific relationship among the symbols in each game, and draws in a case where predetermined symbols (for example, TRG shown in FIG. 7) are to be displayed stopped on a plurality of the display regions, and at the same time setting the display regions other than the specific display region as a general display region, and draws for the general display region, a symbol from the plurality of types of symbols that are to be displayed, so that there isn't a predetermined relationship among the symbols.

In this way, in a case where a predetermined symbol is stop displayed in a plurality of display regions, the display regions that stop display the predetermined symbols are set as specific display regions, and because drawing in a predetermined times of games after the first game is carried out from a plurality of types of symbols that are to be displayed, so that the symbols are displayed the same in each game, same symbols are displayed in the specific display region. By this, an independent re-drawing result which differs from the general display region can be displayed in the specific display region. The display regions other than the specific display regions are set as general display regions. In the general display regions, because drawing is carried out from a plurality of types of symbols that are to be displayed, so that symbols are independently displayed, the general display regions and specific display regions are respectively independent and co-exist. Namely, re-drawing is not carried out using every region, but re-drawing result is displayed in the specific display regions, which are a part of the display regions, and in the region of a remaining part, ordinary drawing result is displayed. By this, because drawing results are displayed by two types of regions: the specific display regions and the ordinary display regions, existing, a new kind of game that arouses the player's interests can be realized. Every display region can become a specific display region, in accordance with the course of the game.

Another control program is structured so that a series of processing including: processing of displaying a plurality of types of symbols in a plurality of display regions (for example W1 to W5 in FIG. 49) upon starting of a game, and setting the display regions where the predetermined symbols are to be displayed stopped, as specific display regions (W 1 and W2) for a predetermined number of games after the next game, in a case where symbols that establish a specific win is stop displayed in the plurality of display regions (for example, W1 and W2, shown in FIG. 49), and drawing for the specific display region, symbols from the plurality of types of symbols, so that at least one same win from a win group that the specific win belongs to is established, and at the same time, setting the display regions other than the specific display region as a general display region, and draws for the general display region, a symbol from the plurality of types of symbols that are to be displayed, so that symbols are displayed independently in each game.

In this way, in a case where a predetermined symbol that establishes a specific win is stop displayed in a plurality of display regions, the display regions that stop display the predetermined symbols that establish a specific win are set as specific display regions in a predetermined times of games from the next game, and because drawing is carried out from a plurality of types of symbols that are to be displayed, so that which ever one win that is the same as a win group that the specific win group belongs to (the group to which the win belongs to) is established in each game, wins can be changed in each game, maintaining a win situation. By this, players feel intrigued, and can raise the player's interest towards the game. The display regions other than the specific display regions are set as general display regions. In the general display regions, because drawing is carried out from a plurality of types of symbols that are to be displayed, so that symbols are independently displayed, the general display regions and specific display regions are respectively independent and co-exist. Namely, re-drawing is not carried out using every region, but re-drawing result is displayed in the specific display regions, which are a part of the display regions, and in the region of a remaining part, ordinary drawing result is displayed. By this, because drawing results are displayed by two types of regions: the specific display regions and the ordinary display regions, existing, a new kind of game that arouses the player's interests can be realized. Every display region can become a specific display region, in accordance with the course of the game.

The above program can be obtained by being recorded in a recording medium such as a CD-ROM and DVD, etc. This kind of program can also be obtained by receiving a signal sent by a computer that is a sending device, via communication networks, etc., constituted of a public telephone line, a dedicated phone line, a cable television circuit, or a radio communication line, etc., that structures a network. This signal is a computer data signal converted by a predetermined carrier wave that includes the program. At the time of sending, at the least, one part of the above program needs to be transmitted. Namely, every data that structures the above program, does not need to exist in the transmission media at one time. In a sending method for sending the program from the above computer, a case of sequentially sending data that structures the program, and a case of intermittently sending is included.

As described above, the gaming machine of the present invention comprises a display unit which can display a plurality of types of symbols on a plurality of display regions, upon starting a game, and a draw control unit which in a case where predetermined symbols are to be displayed stopped on a plurality of the display regions, sets the display regions where the predetermined symbols are to be displayed stopped, as a specific display region, and in a predetermined times of games after the first game, draws for the specific display region, symbols from the plurality of types of symbols that are to be displayed, so that there is a specific relationship among the symbols in each game, and at the same time which sets the display regions other than the specific display region as a general display region, and draws for the general display region, a symbol from the plurality of types of symbols that are to be displayed, so that there isn't a predetermined relationship among the symbols.

In this way, in a case where a predetermined symbol is stop displayed in a plurality of display regions, the display regions that stop display the predetermined symbols are set as specific display regions, and because drawing in a predetermined times of games after the first game is carried out from a plurality of types of symbols that are to be displayed, so that there is a specific relationship among the symbols in each game, symbols having a predetermined relationship are displayed in the specific display region. By this, an independent drawing result (re-drawing result) which differs from the general display region can be displayed in the specific display region. The display regions other than the specific display regions are set as general display regions. In the general display regions, because drawing is carried out from a plurality of types of symbols that are to be displayed without the symbols having a predetermined relationship, the general display regions and specific display regions are respectively independent and co-exist. Namely, re-drawing is not carried out using every region, but re-drawing result is displayed in the specific display regions, which are a part of the display regions, and in the region of a remaining part, ordinary drawing result is displayed. By this, because drawing results are displayed by two types of regions: the specific display regions and the ordinary display regions, existing, a new kind of game that arouses the player's interests can be realized. Every display region can become a specific display region, in accordance with the course of the game.

The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. filed on and including specification, claims, drawings and summary. The disclosure of the above Japanese Patent Application is incorporated herein by reference in its entirety.

What is claimed is:

1. A gaming machine comprising:

an acceptor device configured to accept physical media indicated a monetary value to establish a credit balance;

a display unit having a plurality of display regions, each display region adapted to display one of a plurality of symbols;

a control unit coupled to the acceptor device and the display unit, the control unit configured to:

allow a player to place a wager on a game, via an input device, the wager being deducted from the credit balance;

initiate the game, the game including a symbol to be displayed in each of the plurality of display regions, group at least two of the display regions into a re-drawing group;

determine a single symbol to be displayed in all of the display regions within the re-drawing group from the plurality of symbols; and synchronize movement of the symbols within the re-drawing group; and, provide an award to the player based on an outcome of the game, the award being added to the credit balance.

2. The gaming machine of claim 1, wherein the synchronized movement of the symbols within the re-drawing group includes displaying the same symbols at the same time in the display regions during rotation.

3. The game machine of claim 1, wherein the control unit generates the re-drawing group in response to a trigger condition.

4. The game machine of claim 3, wherein the trigger condition is the appearance of a trigger symbol in one of the display regions during the initiation of the game.

5. The game machine of claim 1, wherein the display regions within the re-drawing group are adjacent.

6. The game machine of claim 1, wherein the control unit groups a first group of display regions into a first re-drawing group and groups a second group of display regions into a second re-drawing group.

7. The game machine of claim 1, wherein the display regions within the redrawing group start and stop simultaneously.

8. The game machine of claim 1, wherein the display regions within the re-drawing group share a common attribute as the single symbol.

9. The game machine of claim 8, wherein the plurality of symbols is selected from a deck of playing cards.

10. A method of providing a game to a player with a gaming machine including a display unit, the display unit having a plurality of display regions, each display region adapted to display one of a plurality of symbols, and a control unit, the method including the steps of:

accepting, via an acceptor device of the gaming machine, physical media indicating a monetary value to establish a credit balance;

allowing a player to place a wager on a game, via an input device of the gaming machine, the wager being deducted from the credit balance;

initiating the game, through the control unit, the game including a symbol to be displayed in each of the plurality of display regions, grouping, on the display unit, at least two of the display regions into a re-drawing group;

determining, through the control unit, a single symbol to be displayed in all of the display regions within the re-drawing group from the plurality of symbols; and synchronizing, through the control unit, movement of the symbols within the re-drawing group; and, providing an award to the player based on an outcome of the game, the award being added to the credit balance.

11. The method of claim 10, wherein the step of synchronizing the movement of the symbols further includes displaying the same symbols at the same time in the display regions during rotation.

12. The method of claim 10, wherein the step of generating the re-drawing group occurs in response to a trigger condition.

13. The method of claim 12, wherein the trigger condition is the appearance of a trigger symbol in one of the display regions during the initiation of the game.

14. The method of claim 10, wherein the display regions within the re-drawing group are adjacent.

15. The method of claim 10, the method further including the steps of:

grouping, through the control unit, a first group of the display regions into a first re-drawing group; and grouping, through the control unit, a second group of the display region into a second drawing group.

16. The method of claim 10, wherein the display regions within the redrawing group start and stop simultaneously.

17. The game machine of claim 10, wherein the display regions within the re-drawing group share a common attribute as a the single symbol.

18. The game machine of claim 17, wherein the plurality of symbols is a deck of playing cards.

19. A non-transitory information recording medium on which a computer readable program is recorded that causes a computer to function as a game machine for providing a game to a player, comprising:

an acceptor device configured to accept physical media indicated a monetary value to establish a credit balance;

a display unit having a plurality of display regions, each display region adapted to display one of a plurality of symbols;

a control unit coupled to the acceptor device and the display unit, the control unit configured to:

initiate the game, the game including a symbol to be displayed in each of the plurality of display regions, group at least two of the display regions into a re-drawing group;

determine a single symbol to be displayed in all of the display regions within the re-drawing group from the plurality of symbols; and synchronize movement of the symbols within the re-drawing group; and, provide an award to the player based on an outcome of the game, the award being added to the credit balance.

* * * * *